United States Patent
Plota et al.

(10) Patent No.: US 12,254,168 B2
(45) Date of Patent: Mar. 18, 2025

(54) AUTOMATED PIXEL SHIFTING WITHIN A DIGITAL IMAGE

(71) Applicants: Troy Plota, Kihei, HI (US); Sascha Connelly, Kihei, HI (US)

(72) Inventors: Troy Plota, Kihei, HI (US); Sascha Connelly, Kihei, HI (US)

(\*) Notice: Subject to any disclaimer, the term of this patent is extended or adjusted under 35 U.S.C. 154(b) by 0 days.

(21) Appl. No.: 17/693,074

(22) Filed: Mar. 11, 2022

(65) Prior Publication Data

US 2022/0197488 A1 Jun. 23, 2022

Related U.S. Application Data

(63) Continuation of application No. 16/735,550, filed on Jan. 6, 2020, now Pat. No. 11,301,119, which is a
(Continued)

(51) Int. Cl.
*G09G 5/00* (2006.01)
*G06F 3/04812* (2022.01)
(Continued)

(52) U.S. Cl.
CPC ...... *G06F 3/04845* (2013.01); *G06F 3/04812* (2013.01); *G06F 3/0484* (2013.01); *G06F 3/04842* (2013.01); *G06T 11/00* (2013.01); *G06T 11/60* (2013.01); *G06T 13/80* (2013.01); *G06V 20/46* (2022.01); *G09G 3/007* (2013.01); *G11B 27/34* (2013.01)

(58) Field of Classification Search
CPC ......... G06T 11/60; G06T 19/00; G06T 11/00; G06F 9/4443; G06F 3/0481

USPC ......................................................... 345/619
See application file for complete search history.

(56) References Cited

U.S. PATENT DOCUMENTS 5,086,482 A 2/1992 Kumagai
6,014,491 A 1/2000 Hair
(Continued)

FOREIGN PATENT DOCUMENTS

CN 104870063 A 8/2015
CN 105393282 A 3/2016
(Continued)

OTHER PUBLICATIONS

Girgensohn, A., et al., "A semi-automatic approach to home video editing," Proceedings of the 13th annual ACM symposium on User interface software and technology, CHI Letters, vol. 2, No. 2, Nov. 8, 2000, pp. 81-89.
(Continued)

*Primary Examiner* — Gordon G Liu
(74) *Attorney, Agent, or Firm* — Workman Nydegger

(57) ABSTRACT

Automating the shifting of pixels within a digital image comprises a processor receiving an indication of a starting point through a user interface. The starting point is received through a user selection of a particular portion of the digital image. Additionally, the processor receives, through the user interface, a direction associated with the starting point. The processor also selects a set of pixels extending in the direction away from the starting point. Further, the processor shifts the set of pixels in the first direction. Shifting the set of pixels comprises rendering and re-rendering in a loop the set of pixels being shifted.

17 Claims, 9 Drawing Sheets

Related U.S. Application Data continuation-in-part of application No. 16/162,206, filed on Oct. 16, 2018, now Pat. No. 10,621,469, and a continuation of application No. 15/660,677, filed on Jul. 26, 2017, now Pat. No. 10,558,342, said application No. 16/162,206 is a continuation-in-part of application No. 15/660,677, filed on Jul. 26, 2017, now Pat. No. 10,558,342.

(60) Provisional application No. 62/574,055, filed on Oct. 18, 2017, provisional application No. 62/514,703, filed on Jun. 2, 2017, provisional application No. 62/368,017, filed on Jul. 28, 2016.

(51) Int. Cl.

| | | |
|---|---|---|
| *G06F 3/0484* | (2022.01) | |
| *G06F 3/04842* | (2022.01) | |
| *G06F 3/04845* | (2022.01) | |
| *G06T 11/00* | (2006.01) | |
| *G06T 11/60* | (2006.01) | |
| *G06T 13/80* | (2011.01) | |
| *G06V 20/40* | (2022.01) | |
| *G09G 3/00* | (2006.01) | |
| *G11B 27/34* | (2006.01) | |

(56) References Cited

U.S. PATENT DOCUMENTS

| | | | |
|---|---|---|---|
| 6,339,426 | B1 | 1/2002 | Lui et al. |
| 8,244,061 | B1 | 8/2012 | Carson et al. |
| 8,280,164 | B2 | 10/2012 | Luo et al. |
| 8,913,847 | B2 | 12/2014 | Tang et al. |
| 9,070,222 | B2 | 6/2015 | McNally et al. |
| 9,400,942 | B2 | 7/2016 | Brookhart et al. |
| 9,466,127 | B2 | 10/2016 | Lindahl et al. |
| 9,692,974 | B2 | 6/2017 | Sakiyama et al. |
| 10,346,017 | B2 | 7/2019 | Plota et al. |
| 10,558,342 | B2 | 2/2020 | Plota et al. |
| 10,621,469 | B2 | 4/2020 | Plota et al. |
| 11,182,641 | B2 | 11/2021 | Plota et al. |
| 2007/0019007 | A1 | 1/2007 | Jung |
| 2009/0189912 | A1 | 7/2009 | Holtman |
| 2010/0134505 | A1 | 6/2010 | Andersen |
| 2010/0149091 | A1 | 6/2010 | Kota et al. |
| 2011/0273583 | A1 | 11/2011 | Yoshino et al. |
| 2013/0044108 | A1 | 2/2013 | Tanaka et al. |
| 2013/0079911 | A1 | 3/2013 | Dong et al. |
| 2013/0201284 | A1 | 8/2013 | Abeloe |
| 2014/0087797 | A1 | 3/2014 | Siddharth et al. |
| 2014/0340421 | A1 | 11/2014 | Otero et al. |
| 2014/0344804 | A1 | 11/2014 | Ein-Gal et al. |
| 2015/0022518 | A1 | 1/2015 | Takeshita |
| 2015/0095882 | A1 | 4/2015 | Jaeger et al. |
| 2015/0262327 | A1* | 9/2015 | Ohta ............... G06T 3/0093 345/646 |
| 2017/0098325 | A1 | 4/2017 | Wampler |
| 2017/0117016 | A1 | 4/2017 | Hoppe et al. |
| 2017/0140514 | A1* | 5/2017 | Amirghodsi ............ G06T 5/005 |
| 2017/0294210 | A1 | 10/2017 | Abramson et al. |
| 2018/0032236 | A1 | 2/2018 | Plota et al. |
| 2018/0349000 | A1 | 12/2018 | Plota et al. |
| 2019/0050674 | A1 | 2/2019 | Plota et al. |
| 2020/0193215 | A1 | 6/2020 | Plota et al. |
| 2021/0165560 | A1 | 6/2021 | Plota et al. |

FOREIGN PATENT DOCUMENTS

| | | |
|---|---|---|
| EP | 1081956 A1 | 3/2001 |
| EP | 2706507 B1 | 3/2017 |
| WO | 2014/078452 A1 | 5/2014 |

OTHER PUBLICATIONS

International Search Report and Written Opinion for application No. PCT/US2017/044256 dated Oct. 6, 2017.

International Search Report and Written Opinion received for PCT Patent Application No. PCT/US2018/056377, mailed on Jan. 4, 2019, 12 pages.

Memorandum and Opinion for Civil Action No. H-21-3873, *Plotagraph, Inc, Troy Plota and Sascha Connelly* Vs. *Lightricks, Ltd.*, Aug. 9, 2022, p. 18.

Non-Final Office Action received for U.S. Appl. No. 16/802,254, mailed on Jan. 7, 2021, 9 pages.

SCIcompanion, Palette Cycling, Mar. 6, 2016. [Online], Retrieved on Sep. 21, 2018, Retrieved from the Internet <URL: http://scicompanion.com/Documentation/palettecycling.html>.

Patent Owner Plotagraph, Inc. and Sascha Connelly's Preliminary Sur-Reply, *Lightricks Ltd.*, V. *Plotagraph, Inc.*, IPR2023-00154, U.S. Pat. No. 10,621,469, Jun. 28, 2023, 9 Pages.

Patent Owner'S Power of Attorney by Plotagraph, Inc. filed by *Lightricks Ltd.*, V. *Plotagraph, Inc. and Sascha Connelly* for U.S. Pat. No. 10,558,342 Under IPR2023-00152, Mar. 21, 2023, 4 pages.

Patent Owner'S Power of Attorney by Plotagraph, Inc. filed by *Lightricks Ltd.*, V. *Plotagraph, Inc. and Sascha Connelly* for U.S. Pat. No. 11,301,119 Under IPR2023-00569, Apr. 26, 2023, 4 pages.

Patent Owner's Power of Attorney By Plotagraph, Inc., *Lightricks Ltd.*, v. *Plotagraph, IPR2023-00154, Inc.*, U.S. Pat. No. 10,621,469, Mar. 21, 2023, 4 Pages.

Patent Owner's Power of Attorney By Plotagraph, Inc., U.S. Pat. No. 11, 182,641, filed by *Lightricks Ltd.*, v. *Plotagraph, Inc.*, Under IPR2023-00568 filed on Apr. 26, 2023, 4 pages.

Patent Owner's Updated Mandatory Notices, *Lightricks Ltd.*, v. *Plotagraph, Inc.*, IPR2023-00154, U.S. Pat. No. 10,621,469. Sep. 23, 2024, pp. 1-4.

Patent Owner's Updated Mandatory Notices, U.S. Pat. No. 11,182,641, filed by *Lightricks Ltd.*, v. *Plotagraph, Inc.*, Under IPR2023-00568 filed on Sep. 23, 2024, pp. 1-4.

Patent Owners Plotagraph, Inc. and Sascha Connelly's Brief Regarding Dismissal, *Lightricks Ltd.*, V. *Plotagraph, Inc.*, IPR2023-00154, U.S. Pat. No. 10,621,469, Apr. 22, 2024, 4 Pages.

Patent Owners Plotagraph, Inc. and Sascha Connelly's Brief Regarding Dismissal, U.S. Pat. No. 11,182,641, filed by *Lightricks Ltd.*, v. *Plotagraph, Inc.*, Under IPR2023-00568 filed on Apr. 22, 2024, pp. 1-4.

Patent Owners Plotagraph, Inc. and Sascha Connelly'S Preliminary Response filed by *Lightricks Ltd.*, V. *Plotagraph, Inc. and Sascha Connelly* for U.S. Pat. No. 11,301,119 Under IPR2023-00569, Jul. 5, 2023, 34 pages.

Patent Owners Plotagraph, Inc. and Sascha Connelly'S Preliminary Response Under 35 U.S.C. §§311-319 and 37 Cfr §42.100 Et Seq. filed by *Lightricks Ltd.*, V. *Plotagraph, Inc. and Sascha Connelly* for U.S. Pat. No. 10,558,342 Under IPR2023-00152, Mar. 22, 2023, 42 pages.

Patent Owners Plotagraph, Inc. and Sascha Connelly's Preliminary Response, *Lightricks Ltd.*, V. *Plotagraph, Inc.*, IPR2023-00154, U.S. Pat. No. 10,621,469, Jun. 7, 2023, 11 Pages.

Patent Owners Plotagraph, Inc. and Sascha Connelly's Preliminary Response, U.S. Pat. No. 11,182,641, filed by *Lightricks Ltd.*, v. *Plotagraph, Inc.*, Under IPR2023-00568 filed on Jul. 6, 2023, pp. 1-33.

Patent Owners Plotagraph, Inc. and Sascha Connelly's Response Under 37 C.F.R. §42.107, *Lightricks Ltd.*, V. *Plotagraph, Inc.*, IPR2023-00154, U.S. Pat. No. 10,621,469, Nov. 22, 2023, 60 Pages.

Patent Owners Plotagraph, Inc. and Sascha Connelly's Response Under 37 C.F.R. §42. 107, U.S. Pat. No. 11,182,641, filed by *Lightricks Ltd.*, v. *Plotagraph, Inc.*, Under IPR2023-00568 filed on Dec. 22, 2023, pp. 1-46.

Patent Owners Plotagraph, Inc. and Sascha Connelly's Sur-Reply, *Lightricks Ltd.*, V. *Plotagraph, Inc.*, IPR2023-00154, U.S. Pat. No. 10,621,469, Mar. 29, 2023, 18 Pages.

Patent Owners Plotagraph, Inc. and Sascha Connelly's Sur-Reply, U.S. Pat. No. 11,182,641, filed by *Lightricks Ltd.*, v. *Plotagraph, Inc.*, Under IPR2023-00568 filed on Apr. 30, 2024, pp. 1-18.

(56) References Cited

OTHER PUBLICATIONS

Patent Owners' Mandatory Notices Pursuant to 37 C.F.R. §42.8(A)(2) filed by *Lightricks Ltd., V. Plotagraph, Inc. and Sascha Connelly* for U.S. Pat. No. 10,558,342 Under IPR2023-00152, Mar. 21, 2023, 3 pages.
Patent Owners' Mandatory Notices Pursuant to 37 C.F.R. §42.8(a)(2), *Lightricks Ltd. v. Plotagraph, Inc.*, Case IPR2023-00154 U.S. Pat. No. 10,621,469, Apr. 13, 2023, pp. 1-3.
Patent Owners' Mandatory Notices Pursuant to 37 C.F.R. §42.8(A)(2) filed by *Lightricks Ltd., V. Plotagraph, Inc. and Sascha Connelly* for U.S. Pat. No. 11,301,119, Under IPR2023-00569, May 11, 2023, 3 pages.
Patent Owners' Mandatory Notices Pursuant to 37 C.F.R. §42.8(a)(2), U.S. Pat. No. 11,182,641, filed by *Lightricks Ltd., v. Plotagraph, Inc.*, Under IPR2023-00568 filed on May 11, 2023, pp. 1-3.
Petition for Inter Partes Review filed by *Lightricks LTD v. Plotagraph, INC. and Sascha Connelly* for U.S. Pat. No. 10,346,017 Under IPR2023-00153, Jul. 9, 2019, 113 pages.
Petition for Inter Partes Review of U.S. Pat. No. 10,558,342 Under 35 U.S.C. §312 filed by *Lightricks Ltd. V. Plotagraph, Inc. and Sascha Connelly* for U.S. Pat. No. 10,558,342 Under IPR2023-00152, Nov. 28, 2022, 104 pages.
Petition for Inter Partes Review of U.S. Pat. No. 11,182,641 Under 35 U.S.C. §312, filed by *Lightricks Ltd., v. Plotagraph, Inc.*, Under IPR2023-00568 filed on Apr. 11, 2023, pp. 1-109.
Petition for Inter Partes Review of U.S. Pat. No. 11,301,119 Under 35 U.S.C. §312 filed by *Lightricks Ltd., V. Plotagraph, Inc. and Sascha Connelly* for U.S. Pat. No. 11,301,119 Under IPR2023-00569, Mar. 22, 2023, 104 pages.
Petitioner's Brief Regarding the Impact of the Federal Circuit's Parallel Affirmance of Invalidity, *Lightricks Ltd., v. Plotagraph, Inc.*, IPR2023-00154, U.S. Pat. No. 10,621,469, Apr. 22, 2024, 10 Pages.
Petitioner's Brief Regarding the Impact of the Federal Circuit's Parallel Affirmance of Invalidity, U.S. Pat. No. 11,182,641, filed by *Lightricks Ltd., v. Plotagraph, Inc.*, Under IPR2023-00568, filed on Apr. 22, 2024, pp. 1-10.
Petitioner's Reply filed by *Lightricks LTD v. Plotagraph, INC. and Sascha Connelly* for U.S. Pat. No. 10,346,017 Under IPR2023-00153, Jul. 9, 2019, 42 pages.
Petitioner's Reply to Patent Owner's Preliminary Response, *Lightricks Ltd., v. Plotagraph, Inc.*, IPR2023-00154, U.S. Pat. No. 10,621,469, Jun. 22, 2023, 10 Pages.
Petitioner's Reply to Patent Owner's Response, U.S. Pat. No. 11,182,641, filed by *Lightricks Ltd., v. Plotagraph, Inc.*, Under IPR2023-00568 filed on Mar. 19, 2024, pp. 1-37.
Petitioner's Request for Oral Argument, *Lightricks Ltd., v. Plotagraph, Inc.*, IPR2023-00154, U.S. Pat. No. 10,621,469, May 21, 2024, 3 Pages.
Petitioner's Request for Oral Argument, U.S. Pat. No. 11,182,641, filed by *Lightricks Ltd., v. Plotagraph, Inc.*, Under IPR2023-00568, filed on May 21, 2024, pp. 1-3.
Petitioner'S Request for Refund of Post-Institution Fees filed by *Lightricks Ltd., V. Plotagraph, Inc. and Sascha Connelly* for U.S. Pat. No. 10,558,342 Under Case IPR2023-00152, Dec. 12, 2023, 3 pages.
Petitioner'S Request for Refund of Post-Institution Fees filed by *Lightricks Ltd., V. Plotagraph, Inc. and Sascha Connelly* for U.S. Pat. No. 11,301,119 Under IPR2023-00569, Dec. 12, 2023, 3 pages.
Petitioner'S Request for Rehearing filed by *Lightricks Ltd., V. Plotagraph, Inc. and Sascha Connelly* for U.S. Pat. No. 10,558,342 Under Case IPR2023-00152, Jul. 20, 2023, 11 pages.
Petitioner's Second Updated Mandatory Notices, *Lightricks Ltd., v. Plotagraph, Inc.*, IPR2023-00154, U.S. Pat. No. 10,621,469, Sep. 19, 2024, 4 Pages.
Petitioner's Second Updated Mandatory Notices, U.S. Pat. No. 11,182,641, filed by *Lightricks Ltd., v. Plotagraph, Inc.*, Under IPR2023-00568 filed on Sep. 19, 2024, pp. 1-4.
Petitioner's Updated Mandatory Notices, *Lightricks Ltd., v. Plotagraph, Inc.*, IPR2023-00154, U.S. Pat. No. 10,621,469, Apr. 12, 2024, 3 Pages.
Petitioner's Updated Mandatory Notices, U.S. Pat. No. 11,182,641, filed by *Lightricks Ltd., v. Plotagraph, Inc.*, Under IPR2023-00568 filed on Apr. 12, 2024, 3 pages.
Power of Attorney Pursuant to 37 C.F.R. § 42.10(B) filed by *Lightricks Ltd.*, for U.S. Pat. No. 11,301,119 Under IPR2023-00569, Feb. 8, 2023, 1 page.
Power of Attorney Pursuant to 37 C.F.R. § 42.10(b), IPR2023-00154, U.S. Pat. No. 10,621,469, Dec. 15, 2022, 1 Page.
Power of Attorney Pursuant to 37 C.F.R. § 42.10(b), U.S. Pat. No. 11,182,641, filed by Lightricks Ltd., Under IPR2023-00568 filed on Feb. 8, 2023, 1 pages.
Power of Attorney, IPR2023-00153, U.S. Pat. No. 10,346,017, Dec. 15, 2022, p. 1.
Power of Attorney, IPR2023-00154, U.S. Pat. No. 10,621,469, Dec. 15, 2022, p. 1.
Prosecution history of U.S. Appl. No. 16/102,055, titled: "Automated Pixel Shifting Within a Digital Image," filed on Aug. 13, 2018.
Scheduling Order, IPR2023-00153 (U.S. Pat. No. 10,346,017), IPR2023-00154 (U.S. Pat. No. 10,621,469), *Lightricks Ltd., v. Plotagraph, Inc.*, IPR2023-00154, U.S. Pat. No. 10,621,469, Sep. 5, 2023, pp. 1-12.
Scheduling Order, U.S. Pat. No. 11,182,641, filed by *Lightricks Ltd., v. Plotagraph, Inc.*, Under IPR2023-00568 filed on Oct. 2, 2023, 12 pages.
Termination Dismissal After Institution of Trial 37 C.F.R. § 42.72, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd., v. Plotagraph, Inc.*, Oct. 21, 2024, 5 pages.
U.S. Appl. No. 15/660,677, dated May 6, 2019, Final Office Action.
U.S. Appl. No. 15/660,677, filed Sep. 26, 2018, Office Action.
Exhibit 1037—Patent Trial and Appeal Case Tracking System (P-TACTS), *Lightricks v. Plotagraph & Connelly*, IPR2023-00154, filed on Jun. 22, 2023, 1 Page.
Exhibit 1038—Patent Trial and Appeal Case Tracking System (P-TACTS), *Lightricks v. Plotagraph & Connelly*, IPR2023-00154, filed on Jun. 22, 2023, 3 pages.
Exhibit 1039—Accepted payment methods, *Lightricks v. Plotagraph & Connelly*, IPR2023-00154, Nov. 17, 2022, 2 pages.
Exhibit 1040—Second Declaration of Philip Greenspun, Ph.D., Case IPR2023-00154, U.S. Pat. No. 10,621,469, Feb. 16, 2024, pp. 1-47.
Exhibit 1040—Second Declaration of Philip Greenspun, Ph.D., U.S. Pat. No. 11,182,641, filed by *Lightricks Ltd., v. Plotagraph, Inc.*, Under IPR2023-00568 filed on Mar. 19, 2024, pp. 1-49.
Exhibit 1040—Second Declaration of Philip Greenspun, PH.D. filed by *Lightricks v. Plotagraph & Connelly* for U.S. Pat. No. 10,346,017 Under IPR2023-00153, Feb. 16, 2024, 56 pages.
Exhibit 1041—Kernighan et al., The C programming language—Second edition, 1988 288 Pages.
Exhibit 1041—Kernighan, B. W. et al., "Programming Language", the Second Edition, 1988, pp. 1-288 filed in IPR2023-00153.
Exhibit 1042—"Inverse Distance Weighted Interpolation", Retrieved on Dec. 27, 2023, pp. 1-3.
Exhibit 1042—Inverse Distance Weighted Interpolation filed by Lightricks Ltd Retrieved on Oct. 27, 2023, 3 pages, Retrieved from https://web.archive.org/web/20120404084929/http://www.ems-i.com/smshelp/Data_Module/Interpolation/Inverse_Distance_Weighted.htm, filed in IPR2023-00153.
Exhibit 1043—U.S. Publication No. 20170098325 filed by Lightricks Ltd., Under IPR2023-00153, Feb. 16, 2024, pp. 1-16.
Exhibit 1044—Igarashi, T., et al., "As-Rigid-As-Possible Shape Manipulation", The University of Tokyo, filed by Lightricks Ltd., 2005, pp. 1-8.
Exhibit 1045—Image Warping by Jeffrey martin, filed by Lightricks Ltd., Under IPR2023-00568 filed on Mar. 19, 2024, pp. 1-27.
Exhibit 1045—Image Warping by Jeffrey martin filed by Lightricks Ltd Under IPR2023-00153, filed on Feb. 16, 2024, pp. 1-27.

(56) References Cited

OTHER PUBLICATIONS

Exhibit 1046—Image Warping and Morphing by Alexey Tikhonov, filed by Lightricks Ltd., Under IPR2023-00568 filed on Mar. 19, 2024, pp. 1-40.
Exhibit 1046—Image Warping and Morphing filed by Lightricks Ltd., Under IPR2023-00153, filed on Feb. 16, 2024, pp. 1-40.
Exhibit 1047—Computational Photography, filed by Lightricks Ltd., Under IPR2023-00568 filed on Feb. 14, 2024, pp. 1-10.
Exhibit 1047—CMU 15-463: Computational Photography filed by Lightricks Ltd. Retrieved on Feb. 14, 2024, pp. 1-10, Retrieved from https://web.archive.org/web/20150910011432/http://graphics.cs.cmu.edu/courses/15-463/2007_fall/ filed in IPR2023-00153.
Exhibit 1048—Affine Matrix Transforms-IM v6 Examples, filed by Lightricks Ltd., Under IPR2023-00568 filed on Jan. 25, 2024, pp. 1-14.
Exhibit 1048—ImageMagick v6 Examples—Affine Matrix Transforms filed by Lightricks Ltd. Retrieved on Jan. 25, 2024, pp. 1-14, Retrieved from https://web.archive.org/web/20120525065408/http://www.imagemagick.org:80/Usage/distorts/affine/ filed in IPR2023-00153.
Exhibit 1049—European Patent Specification of EP Patent No. 2,706,507, filed by Lightricks Ltd., Under IPR2023-00568 filed on Sep. 27, 2011, pp. 1-26.
Exhibit 1049—EP Publication No. 2706507 B1 filed by Lightricks Ltd. Under IPR2023-00153 filed on Feb. 16, 2024, pp. 1-26.
Exhibit 1050—Decision Denying Institution of Inter Partes Review 35 U.S.C. § 314, U.S. Pat. No. 11,301,119, filed by *Lightricks Ltd.*, v. *Plotagraph, Inc.*, Under IPR2023-00568 filed on Oct. 2, 2023, pp. 1-31.
Exhibit 1050—Decision Denying Institution of Inter Partes Review filed by *Lightricks Ltd.* v. *Plotagraph, INC and Sascha Connelly* for U.S. Pat. No. 11,301,119 B2 Under IPR2023-00569, Oct. 2, 2023, pp. 1-31.
Exhibit 1051—Shepard, D., "A two-dimensional interpolation function for irregularly-spaced data.", ACM national conference, 1968, pp. 517-524.
Exhibit 1052—Image Compositing and Blending, Computational Photography by NASA, filed by Lightricks Ltd., Under IPR2023-00568 filed on Mar. 19, 2024, pp. 1-47.
Exhibit 1053—US Publication No. 2016/0080716, Assignee: Dolby Laboratories Licensing Corporation, filed by Lightricks Ltd., Under IPR2023-00568 filed on Nov. 10, 2015, pp. 1-14.
Exhibit 11—Patent Owner's Response filed by *Lightricks LTD.* v. *Plotagraph, INC. and Sascha Connelly* for U.S. Pat. No. 10,346,017 Under IPR2023-00153, Nov. 22, 2023, 68 pages.
Exhibit 13—Patent Owner's Sur-Reply filed by *Lightricks LTD.* v. *Plotagraph, INC. and Sascha Connelly* for U.S. Pat. No. 10,346,017 Under IPR2023-00153, Mar. 29, 2024, 18 pages.
Exhibit 14—Order Conduct of the Proceeding filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2, IPR2023-00568, Apr. 5, 2024, 7 pages.
Exhibit 15—Petitioner's Updated Mandatory Notices filed by *Lightricks LTD.* v. *Plotagraph, INC. and Sascha Connelly* for U.S. Pat. No. 10,346,017 Under IPR2023-00153, Apr. 12, 2024, 3 pages.
Exhibit 16—Petitioner's Brief Regarding CAFC Affirmance filed by *Lightricks LTD.* v. *Plotagraph, INC. and Sascha Connelly* for U.S. Pat. No. 10,346,017 B2 Under IPR2023-00153, Apr. 22, 2024, 10 pages.
Exhibit 17—Patent Owner Brief on Dismissal filed by *Lightricks LTD* v. *Plotagraph, INC. and sascha Connelly* for U.S. Pat. No. 10,346,017 Under IPR2023-00153, Apr. 22, 2024, 4 pages.
Exhibit 18—Order—Denying Request for Oral Argument filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2, IPR2023-00568, May 17, 2024, 8 pages.
Exhibit 19—Petitioner's Request for Oral Argument filed by *Lightricks LTD.* v. *Plotagraph, INC. and Sascha Connelly* for U.S. Pat. No. 10,346,017 Under IPR2023-00153, May 21, 2024, 3 pages.
Exhibit 2—Power of Attorney filed by Lightricks Ltd. for U.S. Pat. No. 10,346,017 Under IPR2023-00153, Dec. 15, 2022, 1 page.
Exhibit 20—Order Granting the Petitioner's Request for Oral Argument filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2,Under IPR2023-00568, May 22, 2024, 10 pages.
Exhibit 2001—Petition for a Writ of Certiorari, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, Mar. 26, 2024, pp. 1-64.
Exhibit 2001—Plaintiff's Original Complaint filed by *Plotagraph, INC. and Troy Plota and Sascha Connelly* v. *Lightricks LTD* for Case No. 4:21-cv-03873 Under IPR2023-00153, Nov. 24, 2021, 13 pages.
Exhibit 2002—Supreme Court of the United States Office of the Clerk, DC 20543-0001, filed by Plotagraph, Inc., Jul. 12, 2024, 2 pages.
Exhibit 2002—Declaration of Marcellous s. Mczeal filed by *Lightricks LTD* v. *Plotagraph, INC. and Sascha Connelly* for U.S. Pat. No. 10,346,017 Under IPR2023-00153, May 19, 2023, 7 pages.
Exhibit 2002—Declaration of Marcellous s. Mczeal, *Lightricks Ltd.* v. *Plotagraph, Inc.*, IPR2023-00154, U.S. Pat. No. 10,621,469, May 19, 2023, 7 Pages.
Exhibit 2003—Petition for a Writ of Certiorari filed by *Plotagraph, INC et al.* v. *Lightricks LTD*, Under IPR2023-00153, Sep. 9, 2024, 64 pages.
Exhibit 2004—Supreme Court Clerk Letter filed by Plotagraph, INC./ Sascha Connelly, Under IPR2023-00153 , Jul. 12, 2024, 2 pages.
Exhibit 21—Order Conduct of the Proceeding filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154,U.S. Pat. No. 11,182,641 B2, IPR2023-00568, May 28, 2024, 3 pages.
Exhibit 22—Leap Request for Oral Hearing in IPR2023-00153, IPR2023-00154, and IPR2023-00568 filed by Lightricks Ltd., Under IPR2023-00153, May 28, 2024, 4 pages.
Exhibit 23—Order—Grant of Good Cause Extension filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2, IPR2023-00568, Jul. 15, 2024, pp. 1-4.
Exhibit 24—Order Extending One-Year Pendency for Good Cause filed by *Lightricks LTD* v. *Plotagraph, INC. and sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2, IPR2023-00568, Jul. 16, 2024, 24 pages.
Exhibit 25—Petitioner's Second Updated Mandatory Notices filed by *Lightricks LTD.* v. *Plotagraph, INC. and Sascha Connelly* for U.S. Pat. No. 10,346,017 Under IPR2023-00153, Sep. 19, 2024, 4 pages.
Exhibit 26—Patent Owner's Updated Mandatory Notices filed by *Lightricks LTD.* v. *Plotagraph, INC. and Sascha Connelly* for U.S. Pat. No. 10,346,017, Under IPR2023-00153, Sep. 23, 2024, 4 pages.
Exhibit 27—Joint Motion to Terminate Inter Partes Review *Lightricks LTD.* v. *Plotagraph, INC. and sascha connelly* for U.S. Pat. No. 10,346,017 Under IPR2023-00153, Oct. 17, 2024, 4 pages.
Exhibit 28—Termination Decision filed by *Lightricks LTD.* v. *Plotagraph, INC. and Sascha Connelly* for U.S. Pat. No. 10,346,017 B2 Under IPR2023-00153, U.S. Pat. No. 10,621,469 B2 Under IPR2023-00154, U.S. Pat. No. 11,182,641 B2 Under IPR2023-00568, Oct. 21, 2024, pp. 1-5.
Exhibit 3—Notice of Filing Date Accorded to Petition and Time for Filing Patent Owner Preliminary Response filed by *Lightricks LTD* v. *Plotagraph, INC. and sascha Connelly* for U.S. Pat. No. 10,346,017 Under IPR2023-00153, Mar. 20, 2023, 6 pages.
Exhibit 3001—Petitioner and Patent Owner in the above identified proceedings, IPR2023-00153, IPR2023-00154, and IPR2023-00568, filed on Apr. 1, 2024, pp. 1-3.

(56) References Cited

OTHER PUBLICATIONS

Exhibit 3001—E-Mail Communication filed Under IPR2023-00153, filed on Apr. 5, 2024, 3 pages.
Exhibit 3002—On Petition for Rehearing En Banc, Case: 2023-1048, filed by *Lightricks Ltd.*, v. *Plotagraph, Inc.*, Mar. 26, 2024, 2 pages.
Exhibit 3003—IPR2023-00153, IPR2023-00154, IPR2023-00568: Oral Hearing, filed on May 22, 2024, 2 pages.
Exhibit 3003—E-Mail Communication filed Under IPR2023-00153, filed on May 28, 2024, 22 pages.
Exhibit 3004—IPR2023-00153, -00154, and -00569—Patent Owner's Petition for Writ of Certiorari, under IPR2023-00153, IPR2023-00154, and IPR2023-00568 filed on Jun. 26, 2024, 2 pages.
Exhibit 3004—E-Mail Communication filed Under IPR2023-00153, filed on Jul. 15, 2024, 2 pages.
Exhibit 3005—IPR2023-00153, -00154, and -00568—Patent Owner's Petition for Writ of Certiorari, under IPR2023-00153, IPR2023-00154, and IPR2023-00568 filed on Jul. 3, 2024, 4 pages.
Exhibit 3005—Email Communications filed on Jul. 3, 2024, 4 Pages.
Exhibit 3005—E-Mail Communication filed Under IPR2023-001523, Jul. 16, 2024, 2 pages.
Exhibit 4—Power of Attorney filed by *Lightricks LTD.* v. *Plotagraph, INC. and Sascha Connelly* for U.S. Pat. No. 10,346,017 Under IPR2023-00153, Mar. 20, 2023, 4 pages.
Exhibit 5—Patent Owners' Mandatory Notices filed by *Lightricks LTD*v. *Plotagraph, INC. and sascha Connelly* for U.S. Pat. No. 10,346,017 Under IPR2023-00153, Apr. 13, 2023, 3 pages.
Exhibit 6—Patent Owner's Preliminary Response filed by *Lightricks LTD.* v. *Plotagraph, INC. and Sascha Connelly* for U.S. Pat. No. 10,346,017 Under IPR2023-00153, Jun. 15, 2023, 11 pages.
Exhibit 7—Petitioner's Reply to Patent Owner's Preliminary Response filed by *Lightricks LTD.* v. *Plotagraph, INC. and Sascha Connelly* for U.S. Pat. No. 10,346,017 B2 Under IPR2023-00153, Jun. 22, 2023, 10 pages.
Exhibit 8—Patent Owners' Sur-Reply filed by *Lightricks LTD.* v. *Plotagraph, INC. and Sascha Connelly* for U.S. Pat. No. 10,346,017 Under IPR2023-00153, Jun. 28, 2023, 9 pages.
Exhibit 9—Decision Granting Institution of Inter Partes Review filed by for U.S. Pat. No. 10,346,017 B2 Under IPR2023-00153, Sep. 5, 2023, 33 pages.
Exhibit-1044—Igarashi, T et al., "As-Rigid-As-Possible Shape Manipulation", ACM Transactions on Graphics (TOG), vol. 24, Issue 3, Jul. 1, 2005, pp. 1134-1141 filed in IPR2023-00153.
Forbes et al., "Analyzing Intrinsic Motion Textures Created from Naturalistic Video Captures", International Conference on Information Visualization Theory and Applications, 2014, 7 Pages.
Grant of Good Cause Extension 35 U.S.C. § 316(a)(11); 37 C.F.R. § 42.100(c), IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, Jul. 15, 2024, 4 pages.
International Preliminary Report on Patentability received for PCT Patent Application No. PCT/US2018/056377, mailed on Apr. 30, 2020, 7 pages.
Joint Motion to Terminate Inter Partes Review, *Lightricks Ltd.* v. *Plotagraph, Inc.*, Case IPR2023-00154 U.S. Pat. No. 10,621,469, Oct. 17, 2024, 4 Pages.
Joint Motion to Terminate Inter Partes Review, filed by *Lightricks Ltd.*, v. *Plotagraph, Inc.*, for U.S. Pat. No. 11,182,641 Under IPR2023-00568, Oct. 17, 2024, 4 pages.
Jury trial demanded, *Lightricks Ltd* Vs. *Plotagraph, Inc.*, Civil Action No. 4:21-CV-03873, May 3, 2022, pp. 96.
Leap Request for Oral Hearing in IPR2023-00153, IPR2023-00154, and IPR2023-00568, filed by Lightricks Ltd., Under IPR2023-00568, May 28, 2024, 4 pages.
Li et al., "Lazy Snapping", Microsoft Research Asia, 2004, pp. 303-308.

*Lightricks LTD* vs *Plotagraph Inc and Sascha Connelly*, Petition for Inter Partes Review, IPR2023-00153, U.S. Pat. No. 10,346,017, Jan. 17, 2023, pp. 113.
*Lightricks LTD*vs *Plotagraph Inc and Sascha Connelly*, Petition for Inter Partes Review, IPR2023-00154, U.S. Pat. No. 10,621,469, Jan. 23, 2023, pp. 111.
*Lightricks Ltd* Vs. *Plotagraph, Inc. and Sascha Connelly*, Declaration of Philip Greenspun, Ph.D., IPR2023-00153, U.S. Pat. No. 10,346,017, Jan. 17, 2023, pp. 204.
*Lightricks Ltd*Vs. *Plotagraph, Inc. and Sascha Connelly*, Declaration of Philip Greenspun, Ph.D., IPR2023-00154, U.S. Pat. No. 10,621,469 Issued on Jan. 20, 2023, pp. 199.
Notice of Accepting Corrected Petition filed by *Lightricks Ltd.*, v. *Plotagraph, Inc. and Sascha Connelly* for U.S. Pat. No. 11,301,119 Under IPR2023-00569 Mailed on Apr. 24, 2023, pp. 1-2.
Notice of Docketing Issued for case No. 2023-1048 on Oct. 17, 2022, 36 Pages.
Notice of Filing Date Accorded to Petition and Time for Filing Patent Owner Preliminary Response filed by *Lightricks Ltd.*, V. *Plotagraph, Inc. and Sascha Connelly* for U.S. Patent No. 11,301,119 Under IPR2023-00569, Mailed on Apr. 20, 2023, pp. 1-6.
Notice of Filing Date Accorded to Petition and Time for Filing Patent Owner Preliminary Response filed by *Lightricks Ltd.*, V. *Plotagraph, Inc. and Sascha Connelly* for U.S. Pat. No. 10,558,342 Under IPR2023-00152 mailed on Dec. 22, 2022, 6 pages.
Notice of Filing Date Accorded to Petition and Time for Filing Patent Owner Preliminary Response, *Lightricks Ltd.* v. *Plotagraph, Inc.*, Case IPR2023-00154 U.S. Pat. No. 10,621,469, Mar. 20, 2023, pp. 1-6.
Notice of Filing Date Accorded to Petition and Time for Filing Patent Owner Preliminary Response, U.S. Pat. No. 11,182,641, filed by *Lightricks Ltd.*, v. *Plotagraph, Inc.*, Under IPR2023-00568 filed on May 23, 2023, pp. 1-5.
Notice of Refund filed by *Lightricks Ltd.*, V. *Plotagraph, Inc. and Sascha Connelly* for U.S. Pat. No. 10,558,342 Under IPR2023-00152, Dec. 14, 2023, 3 pages.
Notice of Refund filed by *Lightricks Ltd.*, V. *Plotagraph, Inc. and Sascha Connelly* for U.S. Pat. No. 11,301,119 Under IPR2023-00569, Dec. 14, 2023, 3 pages.
Okabe et al., "Creating Fluid Animation from a Single Image using Video Database", 2011, vol. 30, No. 7, 10 Pages.
Order Extending One-Year Pendency for Good Cause 35 U.S.C. § 316(a)(11); 37 C.F.R. § 42.100(c), IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, Jul. 16, 2024, 6 pages.
Order Granting the Petitioner's Request for Oral Argument 37 C.F.R. § 42.70, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, May 22, 2024, 10 pages.
Order of Dismissal, *Plotagraph, Inc*, v.*LIGHTRICKS, Ltd.*, Civil Action No. H-21-3873, Aug. 9, 2022, 1 Page.
Order—Conduct of the Proceeding 37 C.F.R. § 42.5, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, May 17, 2024, 8 pages.
Order—Conduct of the Proceeding, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, Apr. 5, 2024, 7 pages.
Order—Conduct of the Proceeding, IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, May 28, 2024, 3 pages.
Paper 24—Order Extending One-Year Pendency for Good Cause 35 U.S.C. § 316(a)(11); 37 C.F.R. § 42.100(c), IPR2023-00153, U.S. Pat. No. 10,346,017, IPR2023-00154, U.S. Pat. No. 10,621,469, IPR2023-00568, U.S. Pat. No. 11,182,641, filed by *Lightricks Ltd.*, v. *Plotagraph, Inc.*, Jul. 16, 2024, pp. 1-6.
Paper No. 1—Petition for Inter Partes Review of U.S. Pat. No. 10,621,469 Under 35 U.S.C. §312, *Lightricks Ltd.*, v. *Plotagraph,*

(56) References Cited

OTHER PUBLICATIONS

*Inc. and Sascha Connelly*, Case IPR2023-00154, U.S. Pat. No. 10,621,469, Apr. 14, 2020, 111 Pages.

Paper No. 12, Petitioner's Reply to Patent Owner's Response, *Lightricks Ltd.*, v. *Plotagraph, Inc. and Sascha Connelly*, Case IPR2023-00154, U.S. Pat. No. 10,621,469, Apr. 14, 2020, 36 Pages.

Exhibit 1013—U.S. Pat. No. 9,466,127, Assignee: Apple Inc., filed by Lightricks Ltd., Under IPR2023-00153, filed on Sep. 30, 2010, pp. 1-35.

Exhibit 1013—U.S. Pat. No. 9,466,127, Assignee: Apple Inc., filed by Lightricks Ltd., Under IPR2023-00568 filed on Sep. 30, 2010, pp. 1-35.

Exhibit 1014—U.S. Pat. No. 9,070,222, Assignee: DreamWorks Animation LLC, filed by Lightricks Ltd., Under 2023-00569, filed on Mar. 13, 2013. pp. 1-31.

Exhibit 1014—U.S. Pat. No. 9,070,222, Assignee: DreamWorks Animation LLC, filed by Lightricks Ltd., Under IPR2023-00152, filed on Mar. 13, 2013, pp. 1-31.

Exhibit 1014—U.S. Pat. No. 9,070,222, Assignee: DreamWorks Animation LLC, filed by Lightricks Ltd., Under IPR2023-00568 filed on Mar. 13, 2013, pp. 1-31.

Exhibit 1015—US Publication No. 2014/0087797, filed by Lightricks Ltd., Under IPR2023-00568 filed on Apr. 30, 2013, pp. 1-28.

Exhibit 1015—US Publication No. 20140087797, filed by Lightricks Ltd., Under 2023-00569, filed on Apr. 30, 2013. pp. 1-28.

Exhibit 1015—US Publication No. 20140087797, filed by Lightricks Ltd., Under IPR2023-00152, filed on Apr. 30, 2013, pp. 1-28.

Exhibit 1015—US Publication No. 20140087797, filed by Lightricks Ltd., Under IPR2023-00153, filed on Apr. 30, 2013. pp. 1-28.

Exhibit 1016—U.S. Pat. No. 9,400,942, Assignee: Ancestry.com Operations Inc., filed by Lightricks Ltd., Under IPR2023-00568 filed on Jan. 5, 2016, pp. 1-17.

Exhibit 1016—U.S. Pat. No. 9,400,942, Assignee: Ancestry.com Operations Inc, filed by Lightricks Ltd., Under 2023-00569, filed on Jan. 5, 2016. pp. 1-17.

Exhibit 1016—U.S. Pat. No. 9,400,942, Assignee: Ancestry.com Operations Inc., filed by Lightricks Ltd., Under IPR2023-00152, filed on Jan. 5, 2016, pp. 1-17.

Exhibit 1017—U.S. Pat. No. 9,692.974, Assignee: Rakuten, Inc., filed by Lightricks Ltd., Under IPR2023-00568 filed on Oct. 17, 2014, pp. 1-33.

Exhibit 1017—U.S. Pat. No. 9,692.974, Assignee: Rakuten, Inc., filed by Lightricks Ltd., Under 2023-00569, filed on Oct. 17, 2014. pp. 1-33.

Exhibit 1017—U.S. Pat. No. 9,692.974, Assignee: Rakuten, Inc., filed by Lightricks Ltd., Under IPR2023-00152, filed on Oct. 17, 2014, pp. 1-33.

Exhibit 1018—Angus, G.F., et al., "Analyzing Intrinsic Motion Textures Created from Naturalistic Video Captures", Lightricks Ltd., 2014 pp. 1-7.

Exhibit 1018—Forbes, A. G. et al., "Analyzing Intrinsic Motion Textures Created from Naturalistic Video Captures", 2014 International Conference on Information Visualization Theory and Applications (IVAPP), 2014, pp. 1-7 filed in IPR2023-00153.

Exhibit 1019—U.S. Pat. No. 8,280,164, Assignee: Eastman Kodak Company, filed by Lightricks Ltd., Under IPR2023-00152, filed on Mar. 4, 2009, pp. 1-8.

Exhibit 1019—U.S. Pat. No. 8,280,164, Assignee: Eastman Kodak Company, filed by Lightricks Ltd., Under IPR2023-00568 filed on Mar. 4, 2009, pp. 1-8.

Exhibit 1019—U.S. Pat. No. 8,280,164, Assignee: Eastman Kodak Company., filed by Lightricks Ltd., Under 2023-00569, filed on Mar. 4, 2009. pp. 1-8.

Exhibit 1020—U.S. Pat. No. 8,913,847, Assignee: Hewlett-Packard Development Company, L. P., filed by Lightricks Ltd., Under 2023-00569, filed on Mar. 22, 2023. pp. 1-15.

Exhibit 1020—U.S. Pat. No. 8,913,847, Assignee: Hewlett-Packard Development Company, L.P., filed by Lightricks Ltd., Under IPR2023-00152, filed on Nov. 28, 2022, pp. 1-15.

Exhibit 1020—U.S. Pat. No. 8,913,847, Assignee: Hewlett-Packard Development Company, L.P., filed by Lightricks Ltd., Under IPR2023-00568 filed on Jul. 26, 2010, pp. 1-15.

Exhibit 1021—Notice of Docketing Case: 23-1048 filed by *Plotagraph, Inc., Troy Plota, Sascha Connelly* V. *Lightricks, Ltd.*, Under 2023-00152, Oct. 17, 2022, pp. 1-36.

Exhibit 1021—Notice of Docketing, Case: 23-1048, L.P., filed by Lightricks Ltd., Under IPR2023-00568 filed on Oct. 17, 2022, pp. 1-36.

Exhibit 1021—Notice of Docketing, Case: 23-1048, L.P., filed by Lightricks Ltd., Under IPR2023-00569 filed on Oct. 17, 2022, pp. 1-36.

Exhibit 1021—Notice of Docketing filed by Lightricks Ltd for Case: 23-1048 Under IPR2023-00153, Document: 1-1, Oct. 17, 2022, pp. 1-36.

Exhibit 1022—Plaintiffs' Opposed Motion for Leave to Serve Second Supplemental Disclosures Pursuant to P. R. 3-1 and P. R. 3-2, Civil Action No. 4:21-CV-03873, filed by Lightricks Ltd., Under IPR2023-00568 filed on May 21, 2022, pp. 1-174.

Exhibit 1022—Plaintiffs' Unopposed Sworn Motion for Leave to Extend Time to Comply With P. R. 3-1 and P. R. 3-2, Civil Action No. 4:21-CV-03873, *Plotagraph et al.* v. *Lightricks*, filed on May 5, 2022, pp. 1-96.

Exhibit 1022-Plaintiffs' Unopposed Sworn Motion filed by *Plotagraph, INC. and Troy Plota and Sascha Connelly* v. *Lightricks LTD* for Civil Action No. 4:21-CV-03873 Under IPR2023-00153, Document 38 , May 5, 2022, pp. 1-96.

Exhibit 1023—U.S. Pat. No. 6,014,491, Assignee: Parsec Sight/Sound, Inc., filed by Lightricks Ltd., Under IPR2023-00568 filed on Mar. 4, 1997, pp. 1-38.

Exhibit 1024—U.S. Pat. No. 5,835,911, Assignee: Fujitsu Limited, filed by Lightricks Ltd., Under IPR2023-00568 filed on Aug. 21, 1995, pp. 1-88.

Exhibit 1025—Adobe—Downloads, filed by Lightricks Ltd., Under IPR2023-00568 filed on Sep. 7, 2012, 3 pages.

Exhibit 1025—"Waiver of the Service of Summons", Civil Action No. 4:21-cv-03873, *Lightricks* v. *Plotagraph & Connelly*, IPR2023-00154, Jan. 20, 2022, pp. 1-2.

Exhibit 1025—Waiver of the Service of Summons filed by *Plotagraph, INC. and Troy Plota and Sascha Connelly* v. *Lightricks LTD* for Civil Action No. 4:21-cv-03873 Under IPR2023-00153, Filed on Jan. 21, 2022, pp. 1-2.

Exhibit 1026—ImageMagick: Downloads, filed by Lightricks Ltd., Under IPR2023-00568 filed on Mar. 25, 2023, 2 pages.

Exhibit 1026 : Exhibits, Case 4:21-cv-03873, IPR2023-00153, Filed on Jun. 22, 2023, 68 pages.

Exhibit 1026—Cease and Desist Letter to Lightricks Ltd., *Lightricks* v. *Plotagraph & Connelly*, IPR2023-00154, Sep. 24, 2018, pp. 1-68.

Exhibit 1027—Declaration of Noa Rosenberg-Segalovitz filed by *Lightricks LTD* v. *Plotagraph, INC and Sascha Connelly* Under IPR2023-00153 and IPR2023-00154, Jun. 21, 2023, 7 pages.

Exhibit 1028—Courts Administration filed by *Lightricks* v. *Plotagraph & Connelly* Under IPR2023-00153, Dec. 19, 2021, 18 pages.

Exhibit 1029—Courts Administration filed by *Lightricks* v. *Plotagraph & Connelly* Under IPR2023-00153, Dec. 19, 2021, 1 page.

Exhibit 1029—Courts Administration, *Lightricks* v. *Plotagraph & Connelly*, IPR2023-00154, Dec. 19, 2021, 1 Page.

Exhibit 1030-Declaration of Idan Megidish filed by *Lightricks* v. *Plotagraph & Connelly* Under IPR2023-00153 and IPR2023-00154, Jun. 22, 2023, 3 pages.

Exhibit 1031—The Park's office building, Gavyammatam, filed on Jun. 22, 2023, 5 Pages.

Exhibit 1032 E-mail Communication filed by *Lightricks* v. *Plotagraph & Connelly* Under IPR2023-00153, filed on Jun. 2, 22, 2023, pp. 1-5.

Exhibit 1032—Email Communications filed on Jun. 22, 2024, 5 Pages.

Exhibit 1033—Declaration of Lu Ling, *Lightricks* v. *Plotagraph & Connelly*, Case IPR2023-00154, U.S. Pat. No. 10,621,469, Jun. 21, 2023, 8 Pages.

Exhibit 1034—Declaration of Robert Greeson, Case IPR2023-00154 U.S. Pat. No. 10,621,469, *Lightricks* v. *Plotagraph & Connelly*, Jun. 22, 2023, pp. 1-3.

(56) References Cited

OTHER PUBLICATIONS

Exhibit 1035—Email Communications filed on Jun. 22, 2023, 7 Pages.
Exhibit 1036—Email Communications filed on Jun. 22, 2023, 6 Pages.
Opinion of the United States Court of Appeals for the Federal Circuit: 23-1048 filed by Plotagraph, Inc., Troy Plota, *Sascha Connelly* V. *Lightricks, Ltd*. Jan. 22, 2024.
US District Court for the Southern District of Texas Houston Division Memorandum and Opinion for Civil Action No. H-21-3873, *Plotagraph, Inc, Troy Plota and Sascha Connelly* Vs. *Lightricks, Ltd.*, Aug. 9, 2022, pp. 18.
"Adobe after effects", help and tutorials, Dec. 1, 2022, pp. 601.
"Examples of ImageMagick Usage", Version 6, Retrieved from https://web.archive.org/web/20120327064501/http://www.imagemagick.org/Usage/, Retrieved on Apr. 11, 2022, 7 Pages.
"ImageMagick v6 Examples—Animation Basics", Retrieved from https://web.archive.org/web/20120310193613/http://www.imagemagick.org/Usage/anim basics/, Retrieved on Jun. 8, 2022, 21 Pages.
"ImageMagick v6 Examples—Distorting Images", Retrieved from https://web.archive.org/web/20120329131929/http://www.imagemagick.org/Usage/distorts/, Retrieved on Apr. 11, 2022, pp. 62.
"ImageMagick v6 Examples—Masks", Retrieved from https://web.archive.org/web/20120928070642/http://www.imagemagick.org/Usage/maskin9/, Retrieved on Apr. 11, 2022, 35 Pages.
"ImageMagick v6 Examples—Usage under Windows", Retrieved from https://web.archive.org/web/20120405151502/http://www.imagemagick.org/Usage/windows, Retrieved on Jun. 3, 2022, 18 Pages.
Decision Denying Institution of Inter Partes Review 35 U.S.C. § 314 *Lightricks Ltd*., v. *Plotagraph, Inc. and Sascha Connelly* for U.S. Pat. No. 11,301,119 Under IPR2023-00569, Oct. 2, 2023, 31 pages.
Decision Denying Institution of Inter Partes Review 35 U.S.C. § 314 filed by *Lightricks Ltd*., V. *Plotagraph, Inc. and Sascha Connelly* for U.S. Pat. No. 10,558,342 Under IPR2023-00152, Jun. 20, 2023, 25 pages.
Decision Denying Petitioner'S Request for Rehearing of Decision Denying Institution of Inter Partes Review 37 C.F.R. § 42.71(D) filed by *Lightricks Ltd*., V. *Plotagraph, Inc. and Sascha Connelly* for U.S. Pat. No. 10,558,342 Under Case IPR2023-00152, Oct. 20, 2023, 10 pages.
Decision Granting Institution of Inter Partes Review 35 U.S.C. § 314, filed by *Lightricks Ltd*., v. *Plotagraph, Inc*., for U.S. Pat. No. 11,182,641 Under IPR2023-00568, Oct. 2, 2023, 26 pages.
Decision Granting Institution of Inter Partes Review 35 U.S.C. § 314, *Lightricks Ltd*. v. *Plotagraph, Inc*., IPR2023-00154 U.S. Pat. No. 10,621,469, Sep. 5, 2023, pp. 1-29.
Declaration of Philip Greenspun for Case IPR2023-00152 and U.S. Pat. No. 10,558,342 Issued on Feb. 11, 2020, 189 Pages.
Declaration of Philip Greenspun, Ph. D. filed by *Lightricks Ltd*., V. *Plotagraph, Inc. and Sascha Connelly* for U.S. Pat. No. 10,558,342 Under IPR2023-00152, Nov. 11, 2022, 189 pages.
Defendant Lightricks Ltd.'S Motion to Dismiss Under Federal Rule of Civil Procedure 12(B (6) Case 4:21-cv-03873 Apr. 7, 2022, 35 pages.
Defendant Lightricks Ltd.'S Reply in Support of Its Motion to Dismiss Plaintiffs' Amended Complaint, *Plotagraph, Inc*, v.*LIGHTRICKS, LTD*., Civil Action No. 4:21-cv-03873, Jul. 7, 2021, 67 Pages.
Exhibit 10—Scheduling Order filed by *Lightricks LTD*. v. *Plotagraph, INC. and Sascha Connelly* for U.S. Pat. No. 10,346,017 B2 Under IPR2023-00153, U.S. Pat. No. 10,621,469 B2 Under IPR2023-00154, Sep. 5, 2023, pp. 1-12.
Exhibit 1001—U.S. Pat. No. 10,558,342, filed by Lightricks Ltd., Under IPR2023-00152, filed on Jul. 26, 2017, pp. 1-20.
Exhibit 1001—U.S. Pat. No. 11,301, 119, Assignee: Plotagraph , Inc., filed by Lightricks Ltd., Under 2023-00569, filed on Jan. 6, 2020, pp. 1-20.
Exhibit 1001—U.S. Pat. No. 10,346,017 B2 filed by Lightricks Ltd. filed on Nov. 28, 2022, 20 pages.
Exhibit 1002—Declaration of Philip Greenspun, Ph. D. filed by *Lightricks Ltd*., V. *Plotagraph, Inc. and Sascha Connelly* for U.S. Patent No. 11,301,119 Under IPR2023-00569, Issued on Apr. 12, 2022, pp. 1-186.
Exhibit 1002—Declaration of Philip Greenspun, Ph.D., *Lightricks Ltd*., v. *Plotagraph, Inc*., Case IPR2023-00154, U.S. Pat. No. 10,621,469, Apr. 14, 2020, 199 Pages.
Exhibit 1002—Declaration of Philip Greenspun, Ph. D filed by *Lightricks LTD* v. *Plotagraph, INC. and Sascha Connelly* for U.S. Pat. No. 10,346,017 Under IPR2023-00153, Jan. 17, 2023, 204 pages.
Exhibit 1003—"Adobe (Registered) After Effects (Registered) Help and tutorials", filed by Lightricks Ltd., filed on Mar. 22, 2023, pp. 1-601.
Exhibit 1003—Adobe (Registered) After Effects (Registered) Help and tutorials filed by Lightricks Ltd., Under 2023-00152, filed on Nov. 28, 2022, pp. 1-601.
Exhibit 1003—Adobe (Registered) After Effects Help and tutorials filed by Lightricks Ltd. Under IPR2023-00153, Filed on Jan. 27, 2023, pp. 1-601.
Exhibit 1004—Thyssen, "Examples of Image Magick Usage—Version 6", Mar. 15, 2011, pp. 1-7.
Exhibit 1004—"Examples of ImageMagick Usage (Version 6)", Image Magick, Retrieved on Apr. 11, 2022, 7 pages, Retrieved from https://web.archive.org/web/20120327064501/http://www.imagemagick.org/Usage/.
Exhibit 1005—Thyssen, "ImageMagick v6 Examples—Distorting Images", Mar. 21, 2012 pp. 1-62.
Exhibit 1005—"Image Magick v6 Examples-Distorting Images", filed by Lightricks Ltd. Under IPR2023-00153 Retrieved on Apr. 11, 2022, 62 pages, Retrieved from https://web.archive.org/web/20120329131929/http://www.imagemagick.org/Usage/distorts/.
Exhibit 1006—"ImageMagick v6 Examples-Masks", filed by Lightricks Ltd Under IPR2023-00153, Retrieved on Apr. 11, 2022, 35 pages, Retrieved from https://web.archive.org/web/20120928070642/http://www.imagemagick.org/Usage/masking/.
Exhibit 1006—Thyssen"ImageMagick v6 Examples—Masks", Mar. 10, 2011, pp. 1-35.
Exhibit 1007—Thyssen, "ImageMagick v6 Examples—Animation Basics", Feb. 8, 2012, pp. 1-21.
Exhibit 1007—"Image Magick v6 Examples—Animation Basics", filed by Lightricks Ltd. Under IPR2023-00153, Retrieved on Jun. 8, 2022, 21 pages, Retrieved from https://web.archive.org/web/20120310193613/http://www.imagemagick.org/Usage/anim_basics/.
Exhibit 1008—Hugemann, "ImageMagick v6 Examples—Usage under Windows", Mar. 21, 2012 pp. 1-18.
Exhibit 1008—"Image Magick v6 Examples—Usage under Windows", filed by Lightricks Ltd. Under IPR2023-00153, Retrieved on Jun. 3, 2022, 18 pages, Retrieved from https://web.archive.org/web/20120405151502/http://www.imagemagick.org/Usage/windows.
Exhibit 1009—Okabe et al., "Creating Fluid Animation from a Single Image using Video Database", Pacific Graphics, vol. 30, No. 7, 2011, pp. 1-10.
Exhibit 1009—Okabe, M. et al., "Creating Fluid Animation from a Single Image using Video Database", Pacific Graphics, vol. 30, No. 7, 2011, pp. 1-10 filed in IPR2023-00153.
Exhibit 1010—Li, Y., et al., "Lazy Snapping", Lightricks Ltd., 2004, pp. 303-308.
Exhibit 1010—Li, Y. et al., "Lazy Snapping", ACM Transactions on Graphics, vol. 3, Issue 3, Aug. 1, 2004, pp. 303-308.
Exhibit 1011—File History of U.S. Appl. No. 15/660,677, 2023-00152 filed on Nov. 28, 2022, pp. 1-378.
Exhibit 1011—File History of U.S. Appl. No. 16/162,206, Title Automated Pixel Shifting Within a Video File, filed on Oct. 16, 2018, 304 Pages.
Exhibit 1011—File History of U.S. Appl. No. 16/735,550, IPR2023-00569 filed on Mar. 22, 2023, pp. 1-254.
Exhibit 1011—File History of U.S. Appl. No. 16/802,254, Under IPR2023-00568 filed on Feb. 26, 2020, pp. 1-231.

(56) References Cited

OTHER PUBLICATIONS

Exhibit 1011—File History for U.S. Appl. No. 16/102,055 entitled, Automated Pixel Shifting Within a Digital Image, Filed on Jan. 17, 2023, 349 pages filed in IPR2023-00153.
Exhibit 1012—Declaration of Nathaniel E Frank-White filed by Lightricks Ltd., Under IPR2023-00152, Jul. 19, 2022, pp. 1-699.
Exhibit 1012—Declaration of Nathaniel E Frank-White filed by Lightricks Ltd., Under IPR2023-00569, Jul. 19, 2022, pp. 1-699.
Exhibit 1012—Declaration of Nathaniel E Frank-White, filed by Lightricks Ltd., Under IPR2023-00568 filed on Jul. 19, 2022, pp. 1-699.
Exhibit 1012—"Declaration of Nathaniel E Frank-White", Archive, Jul. 19, 2022, 699 pages filed in IPR2023-00153.
Exhibit 1013—U.S. Pat. No. 9,466,127, Assignee: Apple Inc., filed by Lightricks Ltd., Under 2023-00569, filed on Sep. 30, 2010, pp. 1-35.
Exhibit 1013—U.S. Pat. No. 9,466,127, Assignee: Apple Inc., filed by Lightricks Ltd., Under IPR2023-00152, filed on Sep. 30, 2010, pp. 1-35.
U.S. Appl. No. 16/102,055, dated Jan. 18, 2019, Final Office Action.
U.S. Appl. No. 16/102,055, dated Oct. 2, 2018, Office Action.
U.S. Appl. No. 16/162,206, dated May 3, 2019, Final Office Action.
U.S. Appl. No. 16/162,206, filed Dec. 26, 2018, Office Action.

\* cited by examiner

AUTOMATED PIXEL SHIFTING WITHIN A DIGITAL IMAGE

CROSS-REFERENCE TO RELATED APPLICATIONS

This application is a continuation of U.S. patent Ser. No. 16/735,550 entitled "Automated Pixel Shifting within a Digital Image", filed Jan. 6, 2020 which is a continuation of U.S. patent Ser. No. 15/660,677 entitled "Automated Pixel Shifting Within a Digital Image", filed on Jul. 26, 2017, now U.S. Pat. No. 10,558,342, issued on Feb. 11, 2020, which claims priority to and the benefit of U.S. Provisional Application 62/514,703 entitled "Automated Pixel Shifting Within A Digital Image", filed on Jun. 2, 2017, and U.S. Provisional Application Ser. No. 62/368,017 entitled "Automated Pixel Shifting Within A Digital Image", filed on Jul. 28, 2016. This application also claims priority to and is a continuation-in-part of U.S. patent Ser. No. 16/162,206 entitled "Automated Pixel Shifting Within a Video File", filed Oct. 16, 2018, now U.S. Pat. No. 10,621,469 issued on Apr. 14, 2020, which claims priority to U.S. Provisional Application No. 62/574,055 entitled "Automated Pixel Shifting Within a Video File," filed on Oct. 18, 2017; and is also a continuation-in-part of U.S. application Ser. No. 15/660,677 entitled "Automated Pixel Shifting Within A Digital Image", filed on Jul. 26, 2017, now U.S. Pat. No. 10,558,342 issued on Feb. 11, 2020, which claims priority to and the benefit of U.S. Provisional Application 62/514,703 entitled "Automated Pixel Shifting Within A Digital Image", filed on Jun. 2, 2017, and U.S. Provisional Application Ser. No. 62/368,017 entitled "Automated Pixel Shifting Within A Digital Image", filed on Jul. 28, 2016. The entire contents of each of the aforementioned applications and/or patents are incorporated by reference herein in their entirety.

BACKGROUND

Computers and computing systems have affected nearly every aspect of modern living. Computers are generally involved in work, recreation, healthcare, transportation, entertainment, household management, etc.

Computers, and in particular the fairly recent boom of digital photography, have changed the entire photography industry. For example, instead of taking pictures and then waiting for film to develop before viewing the images, with modern digital cameras, high quality photographs can be captured and immediately viewed. The increase in digital photography has been accompanied with a related increase in digital image software tools.

Digital image software tools include compression algorithms that dramatically reduce the size of digital images with little or no loss of image quality. Additional, digital image software tools also include tools to edit or otherwise manipulate digital images. For example, many digital image editing tools and digital image sharing tools include filters that can be applied to images to generate desired effects and appearances within an image.

While in some cases the use of digital image tools can appear seamless and quick to an end-user, many of these tools utilize extremely complex computer-based technological solutions. For example, properly applying a filter to an image can involve complex mathematical equations necessary to consistently adjust the color of individual pixels within a digital image.

Adjusting relatively simple aspects of a digital image, such as color, provides many users with highly desirable tools for editing their digital images. Additional, tools are desirable for improving digital images, such as the ability to incorporate movement within a digital image.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise a computer system for automating the shifting of pixels within a digital image. The system comprises one or more processors and one or more computer-readable media having stored thereon executable instructions that when executed by the one or more processors configure the computer system to perform various steps. For example, the system accesses, from memory, a digital image file. The digital image file comprises information that corresponds to individual pixels within the digital image. The system also identifies a particular portion of the digital image to mask. The mask prevents pixels covered by the mask from being shifted. The system also received a first starting point through a user interface. The first starting point is received through a user selection of a first beginning portion of the digital image. Additionally, the system receives a first ending point through the user interface. The first starting point is received through a user selection of a first ending portion of the user interface.

The system then creates a first link between the first starting point and the first ending point. The first link comprises a first direction extending from the first starting point to the first ending point. The first link also comprises a first length between the first starting point and the first ending point. In addition, the system identifies a first set of pixels that lie between the first starting point and the first ending point. The system shifts the first set of pixels in the first direction. Shifting the first set of pixels comprises rendering and re-rendering in a loop the first set of pixels being shifted.

Disclosed embodiments include automating the shifting of pixels within a digital image by using a processor to receive an indication of a starting point through a user interface. The starting point is received through a user selection of a particular portion of the digital image. Additionally, the processor receives, through the user interface, a direction associated with the starting point. The processor also selects a set of pixels extending in the direction away from the starting point. Further, the processor shifts the set of pixels in the first direction. Shifting the set of pixels comprises rendering and re-rendering in a loop the set of pixels being shifted.

Additional disclosed embodiments comprise a method for automating the shifting of pixels within a digital image. The method comprises receiving a first indication of a first starting point through a user interface. The first starting point is received through a user selection of a portion of the digital image. The method also comprises receiving, through the user interface, a first direction associated with the first starting point. Additionally, the method comprises selecting a first set of pixels extending in the first direction away from the first starting point. The method also comprises shifting the first set of pixels in the first direction, wherein shifting the first set of pixels comprises rendering and re-rendering in a loop the first set of pixels being shifted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein comprise systems, methods, and computer-readable media that automate the shifting of pixels within a digital image. Disclosed embodiments provide interfaces and tools for automating the shifting of pixels within a digital image. For example, disclosed embodiments automate the shifting of pixels within a digital photograph of water such that the water appears to be flowing.

In at least one embodiment, a user, through simple interface actions, selects portions of a digital image to automate the shifting of pixels. The user controls the speed of the pixel shifting, the magnitude of the pixel shifting, the direction of pixel shifting, and various other attributes of the pixel movement. Additionally, the user applies masks to the digital image to prevent pixels within specific portions of the digital image from moving. As such, disclosed embodiments provide technical solutions for automating the manipulation of pixels within a digital image.

Figure 1:
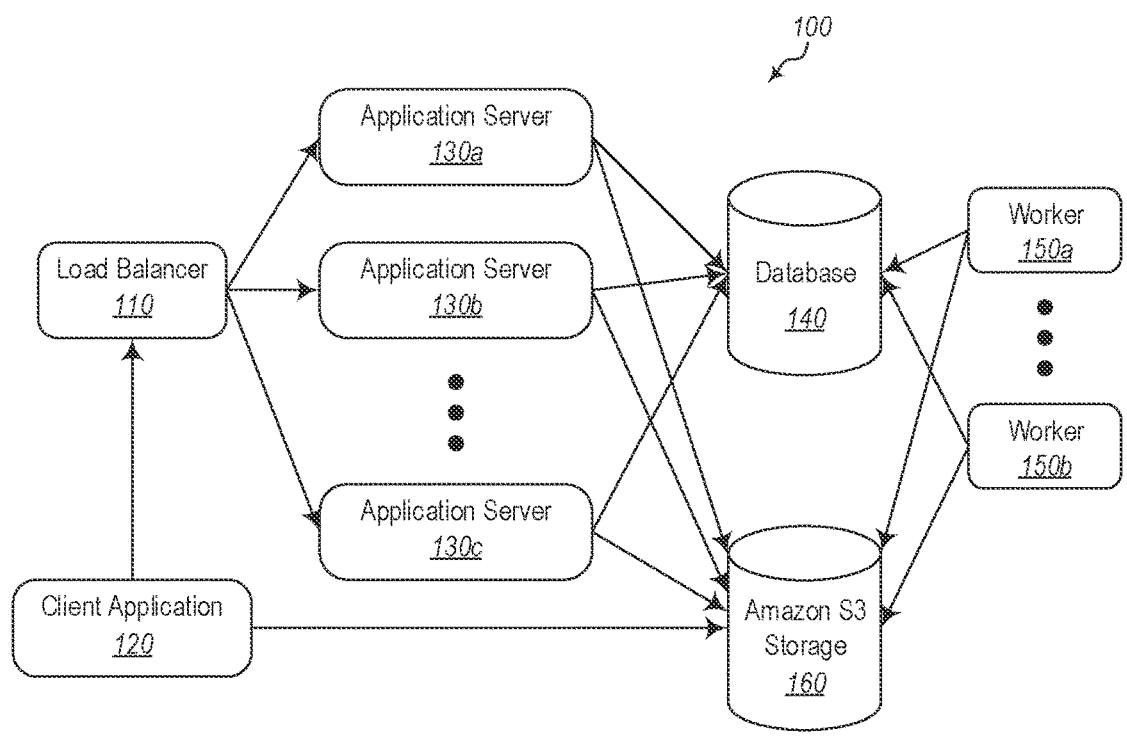
FIG. 1 illustrates a schematic of an embodiment of a computer system for automating the shifting of pixels within a digital image.

For example, FIG. 1 illustrates a schematic of an embodiment of a computer system 100 for automating the shifting of pixels within a digital image. The depicted computer system 100 comprises a variety of different components, including one or more client applications 120, load balancers 110, application servers 130(a-c), databases 140, and workers 150(a-b). In the depicted embodiment, the computer system 100 comprises a network-based or cloud-based system that allows a user to manipulate a digital photograph over a network connection. One will understand, however, that alternate or additional embodiments may be otherwise configured such that the system is otherwise distributed or localized. For instance, in at least one embodiment, the system 100 is executed by a single local computer.

In at least one embodiment, a client application 120 is executed within a web browser at a user's computer. The client application 120 comprises a user interface for uploading, or otherwise selecting, a digital image and issuing commands to cause one or more pixels within the digital image to shift. At least a portion of the processing and actual manipulation of the digital image occurs on an application server 130(a-c) within the cloud. A load balancer 110 balances the processing load of one or more users between multiple application servers 130(a-c). For example, the load balancer 110 may ensure that each application server 130(a-c) is, on average, under the same processing load.

The application servers 130(a-c) and the client application 120 are in communication with one or more web storage services 160, such as AMAZON™ S3 storage. Additionally, the application servers 1430(a-c) may be in communication with various backend databases 140. The various storage services 160 and databases 140 may store the digital images and software components used within the computer system 100.

Figure 2:
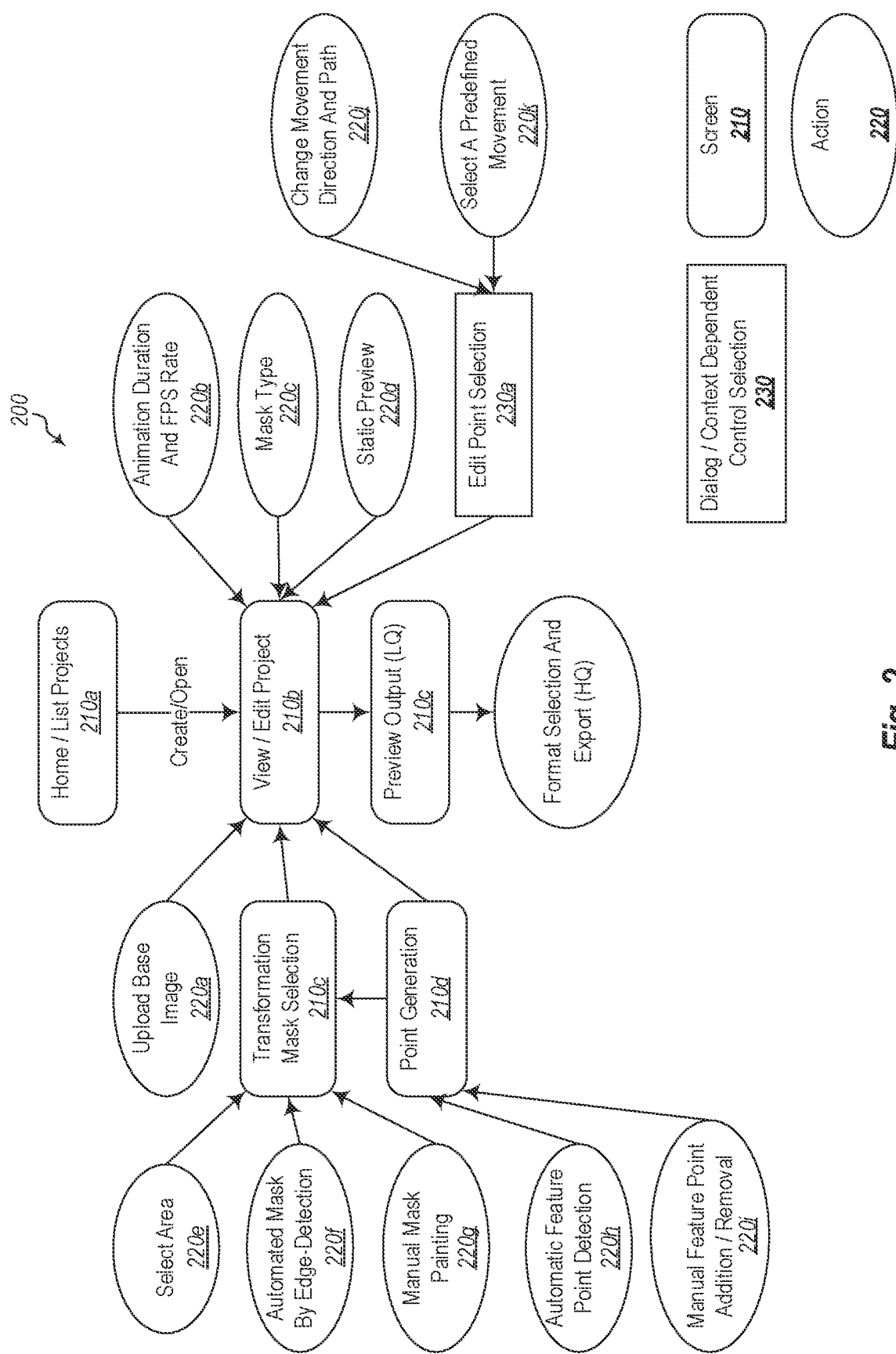
FIG. 2 illustrates a schematic of an embodiment of a software architecture for automating the shifting of pixels within a digital image.

FIG. 2 illustrates a schematic of an embodiment of a software architecture 200 for automating the shifting of pixels within a digital image. In particular, FIG. 2 depicts various screen interfaces 210, actions 220, and dialog/context dependent controls 230 that are present within the software architecture 200. In at least one embodiment, a user is presented with a Home/List Projects screen interface. 210a The Home/List Projects 210a provide the user with a selection of previously saved projects and/or the option to select a digital image and initiate a new project.

Once a user selects a project of choice, the software architecture 200 accesses, from memory, a digital image file of interest. As used herein, a digital image file comprises information that corresponds to individual pixels within a digital image. A view/edit project screen interface 210b provides the user with various editing options, both manual and automated. For example, the editing screen provides the user with actions for uploading a base image 220a, selecting a transformation mask 210c, generating points 210d, adjusting animation duration and FPS rate 220b, selecting a mask type 220c, generating a static preview 220d, and editing a point selection 230a.

In at least one embodiment, a user is presented with options to select between various different types of transformation mask operations. For example, the user can choose a select area option 220e that allows a user to draw boundaries around an area. A mask is then automatically generated within that area. Additionally, a user may select an automated mask by edge-detection option 220f that scans a digital image and automatically identifies distinct areas within the image based upon edge detection. A user may also select a manual mask painting option 220g that allows a user to manually draw a mask on the digital image.

A mask defines a static portion of the image with respect to shifting. In at least one embodiment, the mask is created by using a combination of two tools—automatic and manual. The automatic tool lets the user define masked and shifted areas by drawing lines in them. Any changes along those lines trigger an automatic edge detection using a watershed transformation on the image gradient. This generates a binary mask image that the user can later modify via a simple brush tool. The final mask image is then once again passed through edge detection so it can be saved in vector format.

In at least one embodiment, a mask is later applied in one of two ways. In the first application method, the mask is fixed and is applied by adding static (unmovable) point on all mask edges. In the second application method, the mask is an overlay that cuts-and-pastes the masked portions of the image on top of the animation.

Figure 3A:
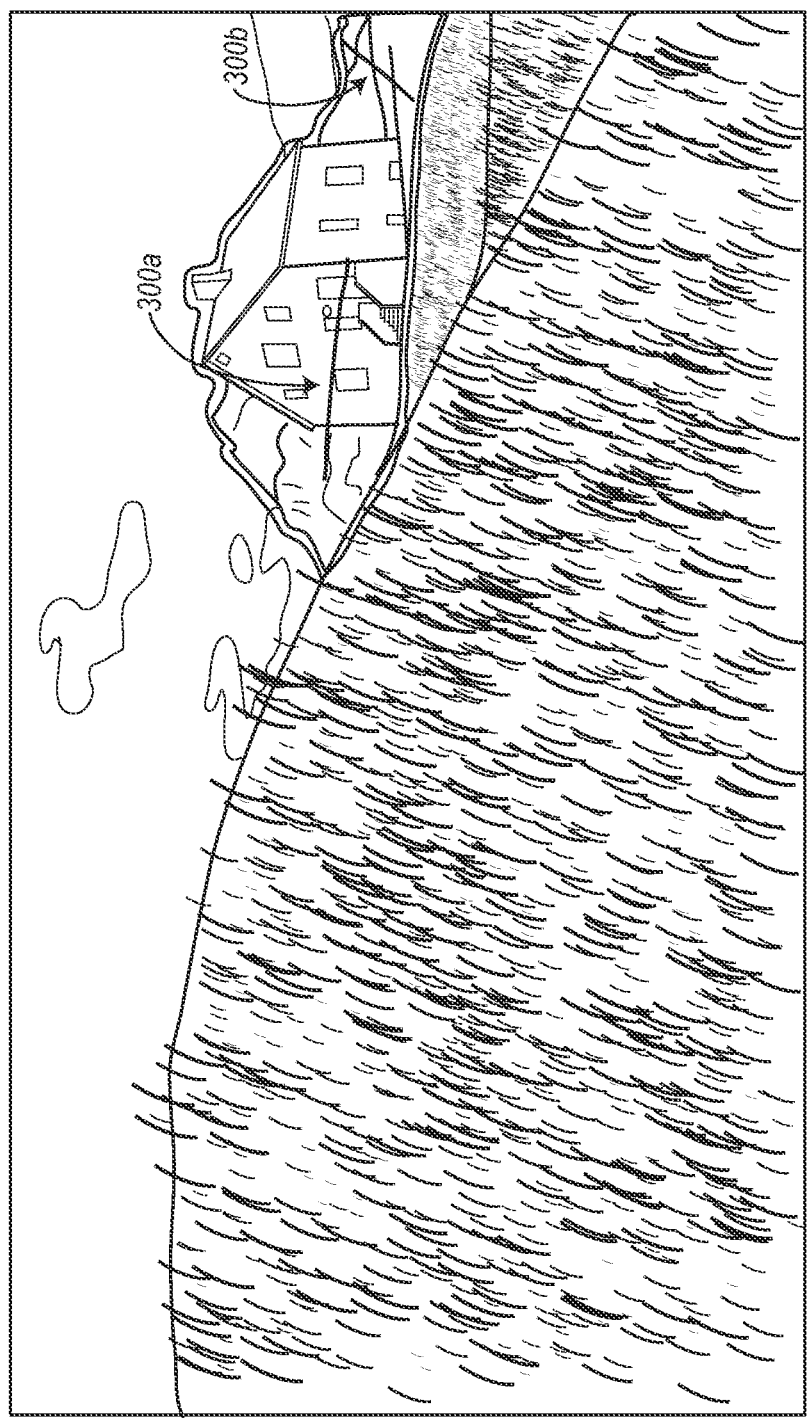
FIGS. 3A-3C illustrate embodiments of a photo that has received beginning and ending points.

For example, FIG. 3A depicts a user utilizing the automated mask by edge-detection option 220f. In particular, the user has drawn two lines 300a, 300b across the house and mountain behind the house. The software architecture 200 interprets the lines as indicating the area that the user wishes to mask. In at least one embodiment, a user may only select a single pixel within the area that should be masked. Various different embodiments may accept a variety of different input interfaces. For example, a user may draw the lines using a computer mouse, a touch interface, a stylus interface, a keyboard interface, or any number of other user interfaces.

Figure 3B:
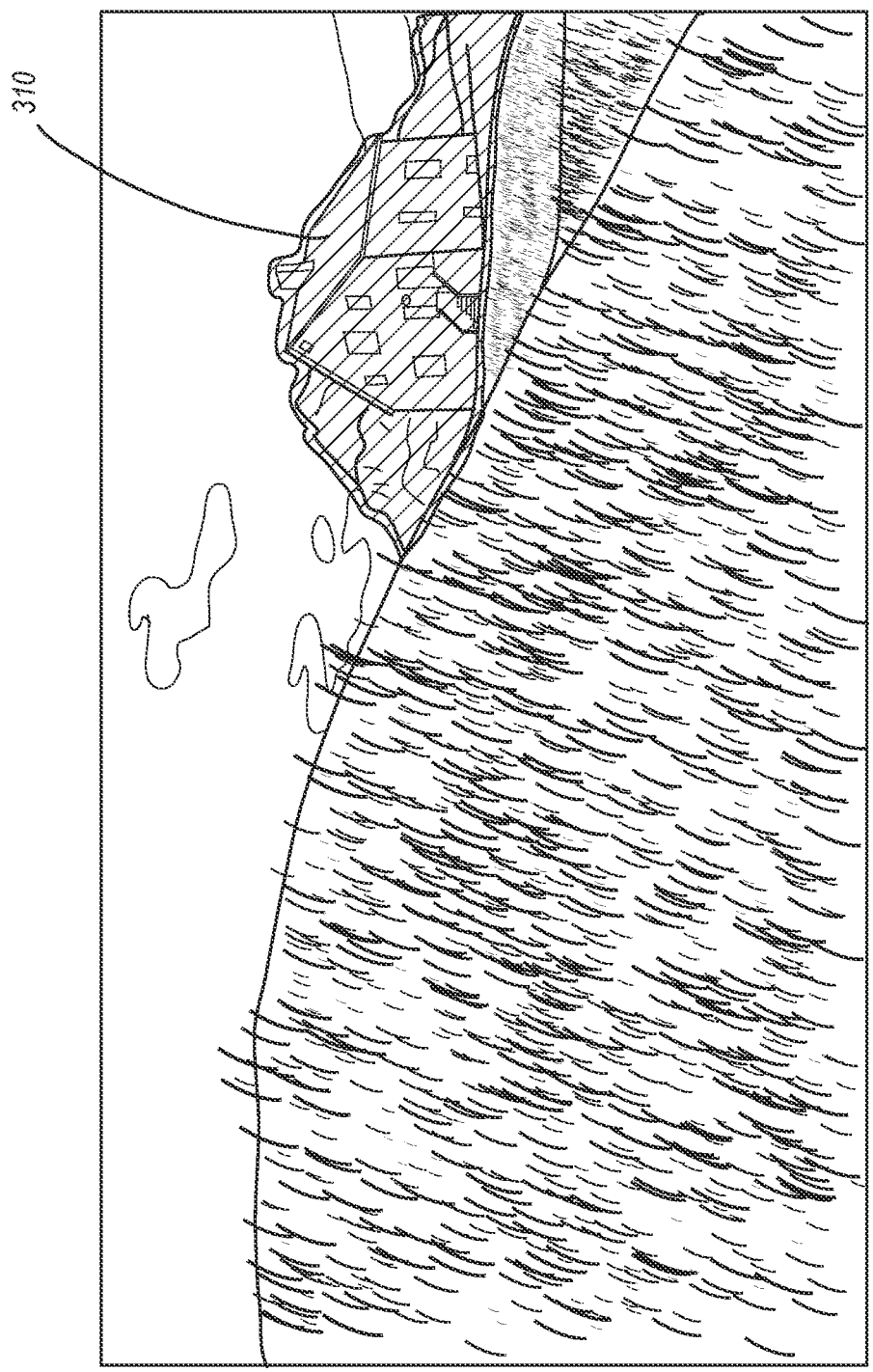

Upon receiving the selection, the software architecture 200 performs an edge detections method to identify edges that form boundaries around the selected area. After identifying a boundary, the software architecture 200 generates a mask to cover the area within the boundary. For instance, FIG. 3B illustrates a mask 310 covering the house and the mountain behind the house, but excluding the sky and the grass in front of the house. As such, a user is provided with tools for identifying a particular portion of the digital image to mask. The mask prevents pixels covered by the mask from being shifted.

In at least one embodiments, methods other than generating a mask are used to prevent portions of a digital from moving. For example, in at least one embodiment, a user selects the manual mask painting option 220g and manually places stabilizer points around a portion of the digital image that should not move. The stabilizer points indicate to the architecture software that pixels associated with the stationary points should be not be shifted or otherwise moved. In at least one embodiment, the stabilizer points are useable for creating a fence around an area that should not be shifted. For example, placing the stabilizer points causes the architecture software to stop shifting pixels at a boundary that is made up of the stabilizer points.

Figure 3C:
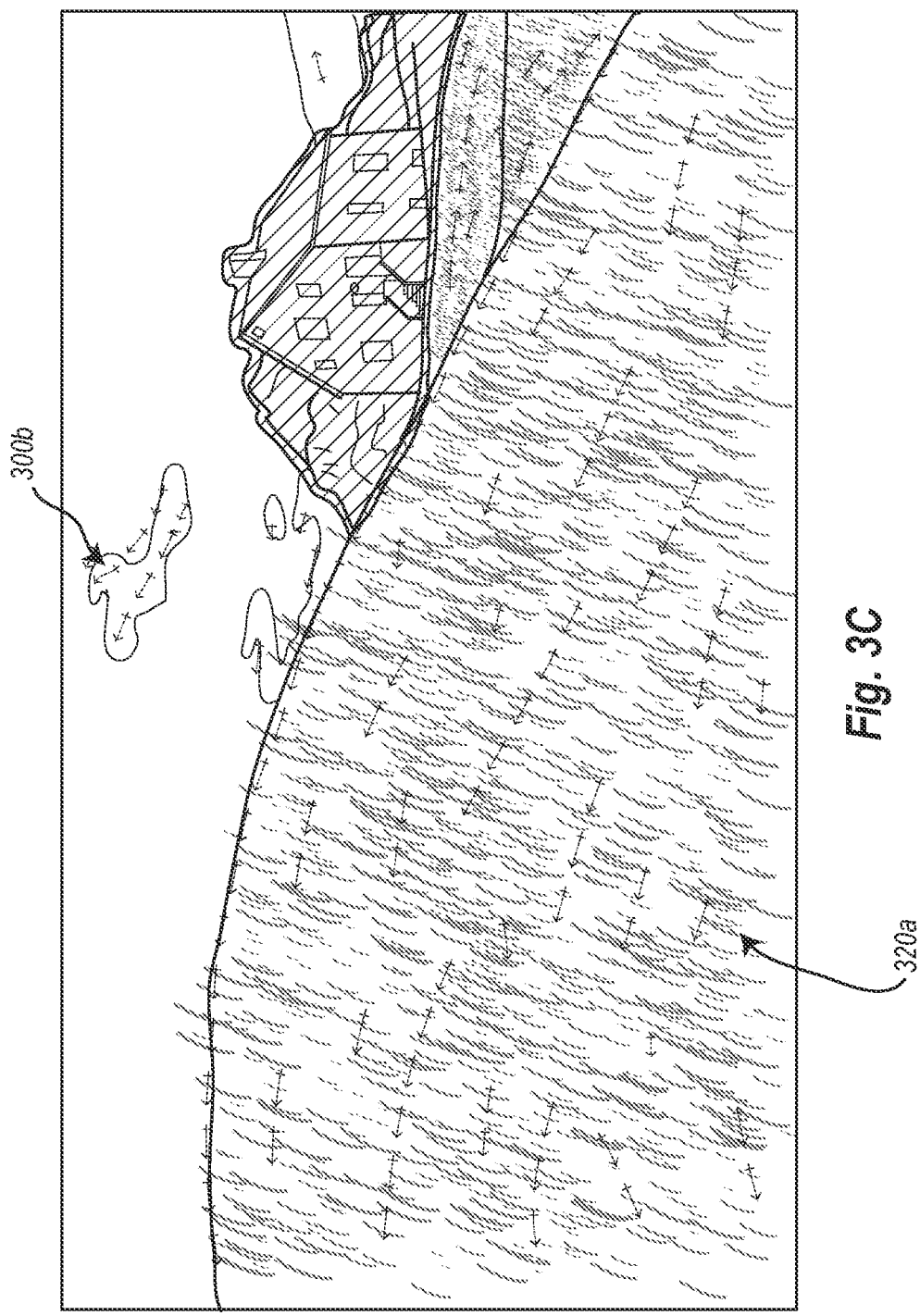

The software architecture 200 also provides a user with a point generation display 210 that comprises options 220h, 220i for generating points. For example, the user may be provided with an automatic feature point detection option 220h that generate points through automatic feature point detection or a manual feature point addition/removal option 220i. When generating points through automatic feature point detection the software architecture 200 identifies areas outside the mask that are associated with directional texture, directional patterns, that otherwise comprise a visually detectable pattern of motion. For example, FIG. 3C depicts the picture of the house and landscape with points drawn throughout the foreground grass 320a and points drawn throughout the clouds in the sky 320b.

In at least one embodiment, the software architecture 200 places the points within the grass based upon identified lines and edges within the grass that extend outward from the ground or from the user generated mask 310. Based upon the lines and textures associated with the grass extending upwards and away from the ground, the software architecture 200 determines that the grass is associated with movement away from the ground. As such, the software architecture 200 automatically places points through the grass.

In at least one embodiment, a user can alternatively or additionally manually add or remove points. For example, a user can manually add all of the points depicted in FIG. 3C or a user can direct the software architecture 200 to automatically add a portion of the points and then the user can add additional points.

In at least one embodiment, points are added to a digital image in two different stages. During the first stage, the software architecture 200 receives a first starting point through a user interface. A starting point is received through a user selection of a beginning portion of the digital image. The beginning portion of the digital image comprises a starting pixel, or area, from which the user wishes pixels to shift. For example, in FIG. 3C, various beginning points (also referred to herein as "starting points") comprise the points nearest to the base of the grass and represented by crosses comprise starting points. In at least one embodiment, a beginning point comprise a particular pixel that is selected by a user or automatically selected by the software architecture 200.

During the second stage of the point generation, the software architecture 200 receives an ending point through the user interface. The ending point is received through a user selection of an ending portion of the user interface. The ending portion of the digital image comprises an ending pixel, or area, to which the user wishes pixels to shift. For example, in FIG. 3C various ending points are selected on the outer periphery of the grass and are represented by arrows. In at least one embodiment, each starting point is paired with a specific ending point and vice versa. Additionally, the software architecture creates a link between the starting point and first ending point. In at least one embodiment, a link is a vector extending from the starting point to the ending point. A link comprises a direction extending from the first starting point to the first ending point and a length between the first starting point and the first ending point.

A user is capable of choosing the direction of a link and length of a link at will. For example, upon placing a starting point, the user can place an associated ending point at any other location within the user interface—even outside the edges of the digital image. As such, in at least one embodiment, a single digital image can be associated with a multitude of different starting points, ending points, and associated links going in different directions and comprising different lengths. In the case the points are generated automatically by the software architecture 200, a user is free to move and adjust the points in any way that is desirable.

Figure 4:
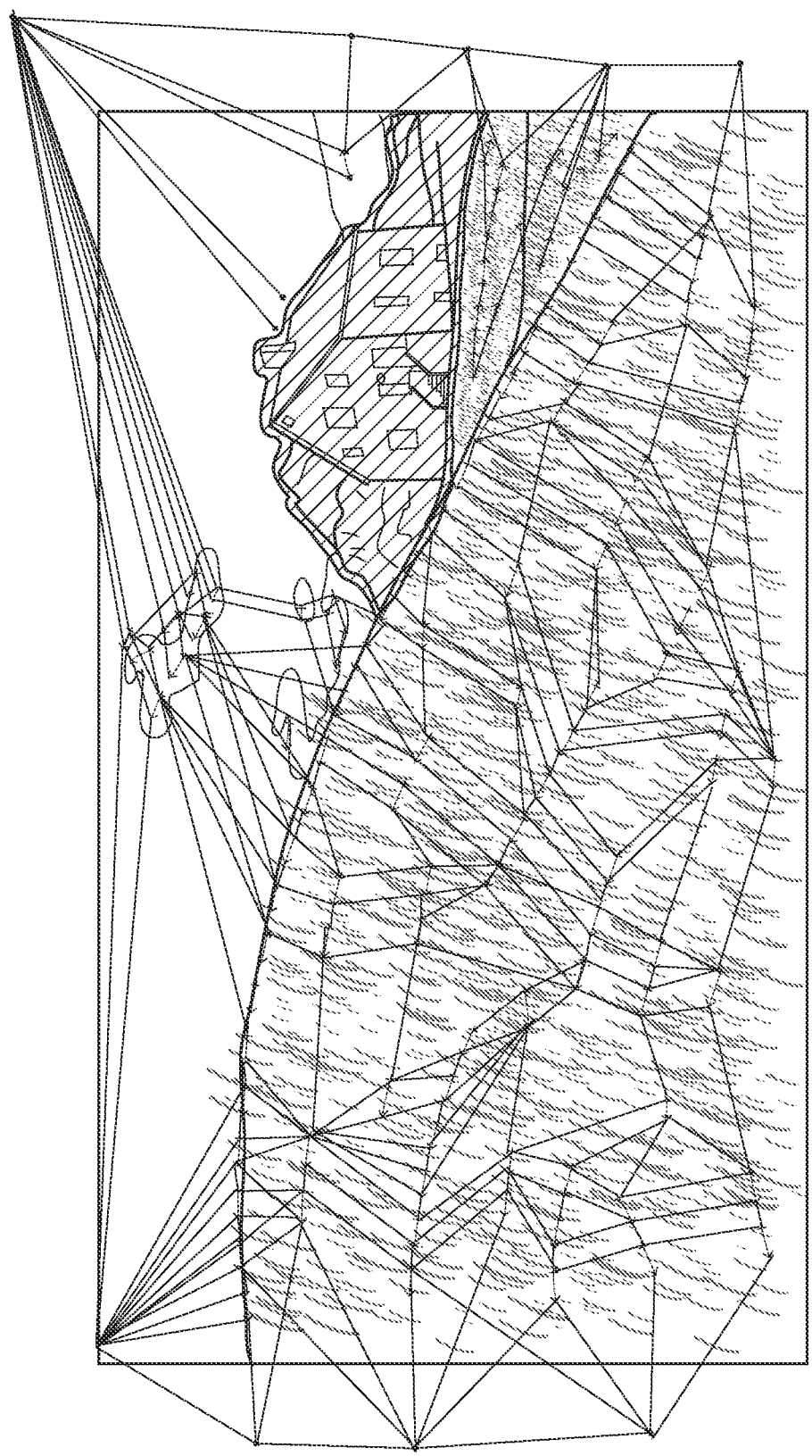
FIG. 4 illustrates an embodiment of a photo that has formed a mesh from received beginning and ending points.

In at least one embodiment, the software architecture 200 generates a starting mesh from the collective starting points. Similarly, the software architecture 200 generates an ending mesh from the collective ending points. For example, FIG. 4 depicts a starting mesh and ending mesh overlaid on the digital image of the house and landscape. In at least one embodiment, the software architecture provides the user with the option of viewing one or both of the meshes.

Visualizing the meshes may assist a user in viewing the inputs that cause the pixels to shift.

Once a user has established one or more starting and ending point pairs, the software architecture identifies sets of pixels that lie between the respective starting points and the respective ending points. In at least one embodiment, a first set of pixel may comprise a group of pixels that intersect with a link between a starting point and an ending point and that are not covered by a mask. The size of the group of pixels may be user selectable or automatically determined. For example, a user may increase the threshold distances that the set of pixels extend beyond the link. As such at one extreme, the set of pixels may comprise a line of individual pixels extending from the starting point to the ending point, or at another extreme the set of pixels may comprise a relatively wide swatch of pixels that are parallel to the link that extends between the starting point and the ending point.

After identifying the appropriate set of pixels associated with each starting point and ending point pair, the software architecture 200 shifts the respective sets of pixels in the direction determined by their relative links. In at least one embodiment, shifting the sets of pixels comprises rendering and re-rendering in a loop the sets of pixels being shifted. Additionally, as described above, different sets of pixels may be associated with different directions. As such, sets of pixels may travel in different directions within the digital image.

In at least one embodiment once pixels begin to shift, the user may notice that a particular portion of the digital image that the user desired to not move is in fact being shifted. To correct this error, the user can edit the mask such that it covers the portion of interest. Additionally, in at least one embodiment, to correct the error, the user executes a feather tool that blurs the portion of interest such that the shifting pixels are no longer noticeable. In a further embodiment, the user places stabilizer points along the portion of interest. The stabilizer points may be placed with a simple click along the particular portion of the digital image. The stabilizer point cause pixels within the particular portion of the digital image to not be shifted.

Figure 5A:
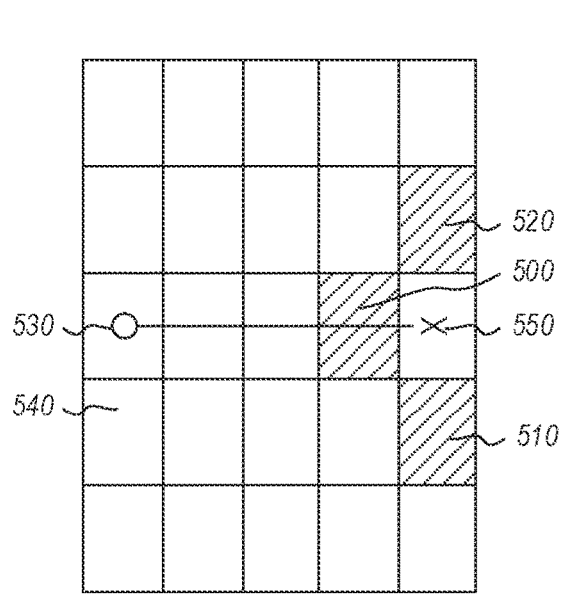
FIGS. 5A-5D illustrates embodiments of individual pixels being shifted.

By way of example, FIGS. 5A-5D depict embodiments of individual pixels being shifted. In particular, FIG. 5A depicts a starting point 550, an ending point 530, and an associated link 540. Additionally, FIG. 5A depicts exemplary pixels 500, 510, and 520. One will understand that the pixels 500, 510, 520 are provided only for the sake of clarity and explanation and that in various embodiments the pixels may comprise a variety of different colors.

Figure 5B:
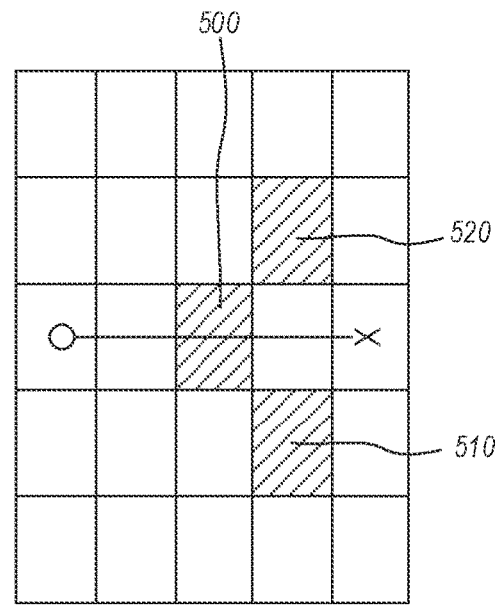

FIG. 5A depicts the pixels 500, 510, 520 in their original state within the digital image. Once the software architecture 200 begins shifting the set of pixels in the direction of the link (extending from the starting point to the ending point), the pixels 500, 510, 520 are moved. For example, FIG. 5B depicts the pixels 500, 510, 520 after the initial movement. As compared to FIG. 5A the set of pixels are shifted left, along the direction of the link, one space.

In various embodiments, a user is provided with an animation duration and FPS rate option 220b for determining the step size within the shift and/or the speed at which the shift occurs. For example, while the embodiment depicted in FIGS. 5A-5D have a step size of a single pixel space, in various embodiments, the pixels may shift multiple pixels at a time. Additionally, in at least one embodiment the step size is time constrained. For example, a user may indicate that each respective loop in the pixel shifting only take 2 seconds. In such a case, the step size may be determined by the length of the link and the frame rate of the shifting. In other words, one set of pixels may need to travel a link length of 20 pixels within the 2 seconds, while another set of pixels may only need to travel a link length of 6 pixels within two seconds. As such, based upon the frame rate at which the steps occur, the two sets of pixels would operate at different step sizes. In at least one embodiment, a user can set a particular desired framerate to be associated with a digital image. Additionally, in at least one embodiment, the magnitude of the shifting of a set of pixels is proportionally related to the length of an associated link.

In contrast in at least one embodiment, the step size of each set of pixels is consistent such that sets of pixels along longer links take more time to complete a loop than sets of pixels along shorter links. Accordingly, a user can create a particularly long link to indicate a long, or more extended, motion within a digital image. In contrast, the user can create a particular short link to indicate a short, or faster, motion within the digital image.

Figure 5C:
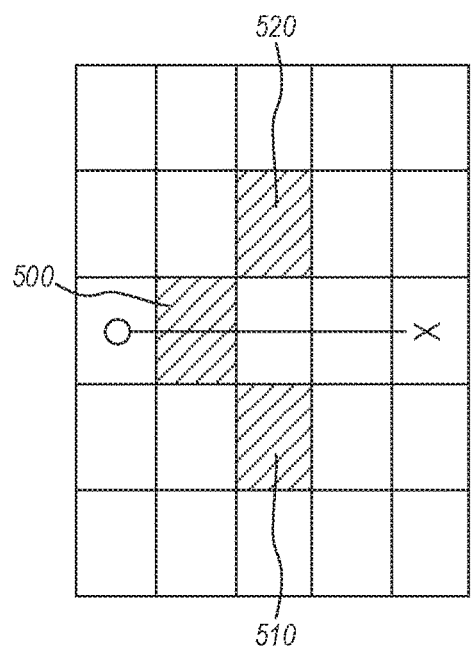
Figure 5D:
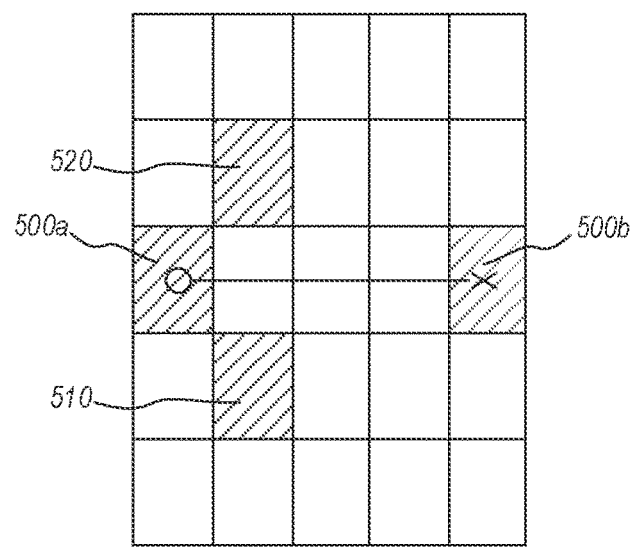

FIG. 5C depicts pixels 500, 510, 520 another step along the shift. In FIG. 5D the pixels 500, 510, 520 are shown at yet another step along the shift, but in this step the pixels 500, 510, 520 are beginning to loop around. For example, pixel 500a is at the left of the shift, while corresponding pixel 500b is reappearing at the right of the shift to begin the shifting loop. In various additional or alternative embodiments, the set of pixels only begins to loop as pixels 500, 510, 520 leave the screen. For example, once pixel 500a reaches the end of the link (i.e., ending point 530), pixel 500a disappears on the next step. Upon disappearing, pixel 500b then reappears at the beginning of the link (i.e., starting point 550) to start the loop. Additionally, in at least one additional or alternative embodiment, the pixels 500, 510, 520 fade in and out at the beginning and ending of each loop. For example, upon reaching the end of the link, pixel 500a fades out of the image by slowing growing transparent, such that the disappearance of pixel 500a is not abrupt or jarring. Similarly, pixel 500b can fade in such that its appearance is not abrupt of jarring.

In various alternative or additional embodiments, different methods of pixel shifting and blending can be used to similar effect. For example, in at least one embodiment, the pixels immediately begin cycling as soon as the shifting begins. For example, instead of what is shown in FIGS. 5A-5D, as soon as pixel 500 shifted to its new position depicted in FIG. 5B, pixel 500B would appear in the position depicted in FIG. 5D. As such, the pixels begin looping and blending into each other immediately.

In at least one embodiment, the software architecture 200 uses alpha blending when shifting the pixels from the starting point to the ending point. For example, the software application 200 may utilize a sin, cosine, or linear alpha blend to shift the set of pixels. Additionally, in at least one embodiment, the software architecture uses a warping function, such as a Shepard's distortion. When using a mesh algorithm, the software architecture 200 triangulates the mesh using defined points and then calculates an affine transformation for every triangle. Further, the software architecture 200 supports animation blending in order to achieve the seaming effect of a continuous motion. This is achieved by blending animated frames two by two using one of a few predefined blend functions.

Similarly, a user is provided with a mask type option 220c to select between different types of masks. Each different mask type may use different mask configurations. In at least one embodiments, mask types also vary by the color that is used to depict the mask within the image.

Figure 6B:
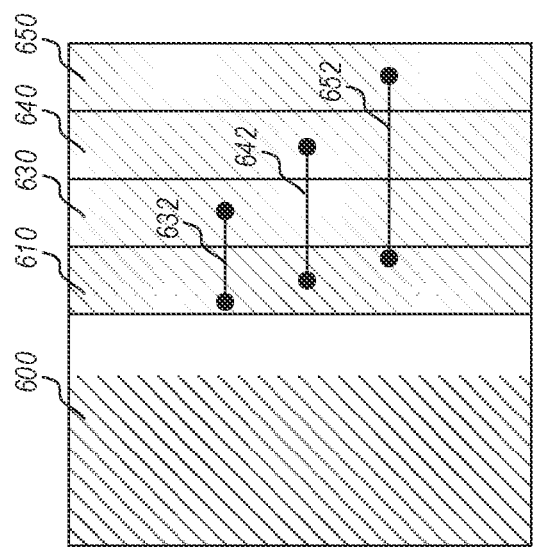
FIG. 6B illustrates another embodiment of a mask
Figure 6A:
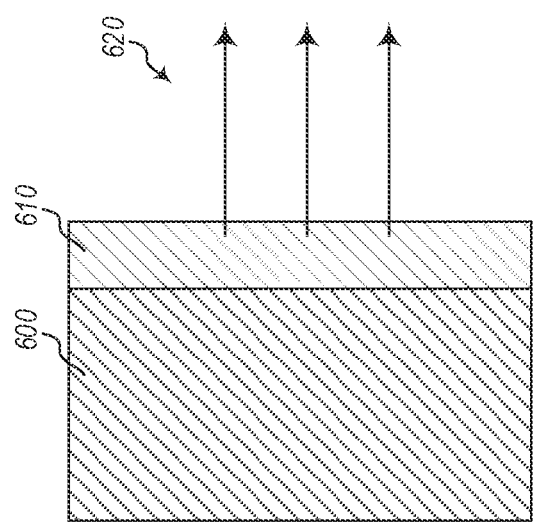
FIG. 6A illustrates an embodiment of a mask.

For example, FIGS. 6A and 6B illustrate an embodiment of a mask 600. In the depicted embodiment, a strip of points 610 on the edge of the mask ("edge strip") is used to generate the flow of points simulating an animation. The dimensions and shape of the edge strip depend on properties of the mask and the user selected flow. In at least one embodiment, the width of the edge strip 610 is determined as a linear function of the dimensions of the target image. Further, the shape of the edge strip 610 may be a result of sliding the shape of the mask 600 in the direction of the vector flow. As such, a user is able to customize the mask.

When in use, the mask 600 assists in generating pixel flow. For example, as depicted in FIG. 6B the points 632, 642, 652 on the edge strip 610 are being stretched in order to generate a flow of points in the desired direction. For example, the points 632, 642, 652 are shown as being stretched to strips 630, 640, 650 that are stretched from the edge 610 of the mask 600. The stretching motion is performed continuously such that the points 632, 642, 652 are continuously reset and stretched such that the pixel shifting is continuous and results in the impression of motion.

In various additional or alternative embodiments, a user has the ability to further manipulate a digital image. For example, instead of the straight links depicted in FIGS. 5A-5D, the use can view an edit point selection dialog 230a as depicted in FIG. 2. The edit point selection provides a user with the options of changing a movement direction and path 220j or selecting a predefined movement 220k. For example, instead of straight links extending between a starting point and ending point, the user can create a custom path between any two starting and ending points. In such a case, the associated set of pixels would travel along the path of the link. Similarly, the user may select a predefined path (i.e., movement) that is defined within the software architecture 200. For example, the predefined paths may include a curved path. Using the curved path option, the user can cause a set of pixels to travel along a curved path (i.e., link) between a starting and ending point.

Once a user is satisfied with their work on an image, a preview output screen 210e allows a user to view the image while the pixels are being shifted. Such a view may give the impression that at least a portion of the static image is animated. In contrast, a user is also give a static preview option 220d that allows the user to view the un-animated image. If the user is satisfied with the final product, the user is provided with a format selection and export action 220. This action generates a variety of different formats that are configured for viewing. For example, an animated GIF may be produced.

Additionally, in at least one embodiment, a user is able to save all of the masking work, point generation work, and animation duration and FPS rate work separate from the underlying image. For example, the user may perform the above discussed steps on a particular photo. The user may then decide to manipulate the photo within a photo editor application. In such a case, instead of having to restart the animation process with the modified photo, the user applies the previously saved animation work to the modified photo.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

One will appreciate that embodiments disclosed herein can also be described in terms of flowcharts comprising one or more acts for accomplishing a particular result. For example, FIG. 7 and the corresponding text describe acts in various methods and systems for automating the shifting of pixels within a digital image. The acts of FIG. 7 are described below.

Figure 7:
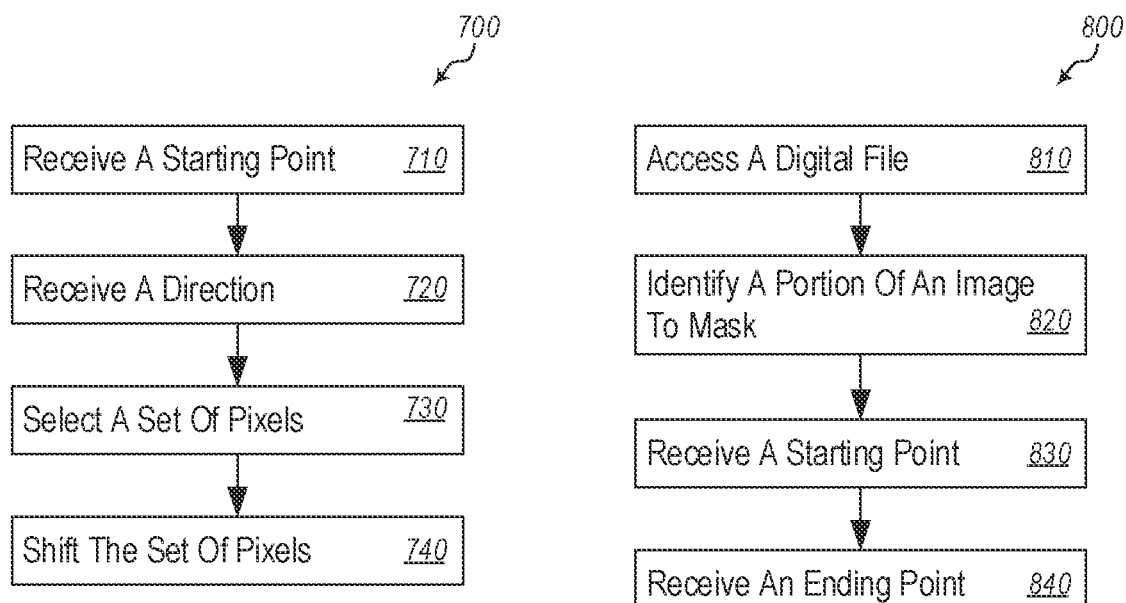
FIG. 7 illustrates a flow chart of an embodiment of a method for automating the shifting of pixels within a digital image.

For example, FIG. 7 illustrates that a flow chart of an exemplary method 700 for automating the shifting of pixels within a digital image includes an act 710 of receiving a starting point. Act 710 comprises receiving an indication of a starting point through a user interface, wherein the starting point is received through a user selection of a particular portion of the digital image. For example, as depicted and explained with respect to FIG. 5A, a user selects a starting point 550. Similarly, FIG. 3C depicts various user-selected starting points surrounding the grass in the digital image.

Additionally, FIG. 7 illustrates that the method includes an act 720 of receiving a direction. Act 720 comprises receiving, through the user interface, a direction associated with the starting point. For example, as depicted and explained with respect to FIG. 5A, the use can select an ending point 530. A link 540 is then formed between the starting point 550 and the ending point 530. The link 540 is associated with a direction extending from the starting point 550 to the ending point 530. As such, the software architecture 200 receives a direction from the link 540.

In contrast, in additional or alternative embodiments, the software architecture 200 can receive a direction without the use of an ending point 530 or a link 540. For example, the software architecture 200 may receive the direction from a default setting stored within memory or explicitly from the user. Further, in at least one embodiment, the software architecture 200 identifies a direction from line and edge detection. For example, the software architecture 200 may identify a direction that follow the blades of grass depicted in FIG. 3A. In any case, in at least one embodiment, a user may only need to enter a starting point and the direction is identified either automatically or through user interaction other than the creation of an ending point.

FIG. 7 also illustrates that the method includes an act 730 of selecting a set of pixels. Act 730 comprises selecting a set of pixels extending in the direction away from the starting point. For example, as depicted and explained with respect to FIG. 5A, the software architecture 200 selects a set of pixels 500, 510, 520 that extend in the direction of the link 540 away from the starting point 550. The computer architecture 200 may define the set of pixels 500, 510, 520 as being every pixel that extends in the direction away from the starting point and that is within a user or computer-defined threshold distance from the link 540.

Further, FIG. 7 illustrates that the method includes an act 740 of shifting the set of pixels. Act 740 comprises shifting the set of pixels in the first direction. Shifting the set of pixels comprises rendering and re-rendering in a loop the set of pixels being shifted. For example, as depicted and explained with respect to FIGS. 5A-5D, a shifting loop is described where pixels 500, 510, 520 are shifted upward and then re-looped.

Figure 8:
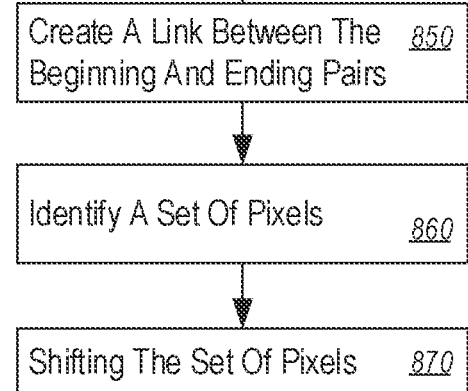
FIG. 8 illustrates a flow chart of another embodiment of a method for automating the shifting of pixels within a digital image.

Additionally, FIG. 8 depicts an embodiment of a method 800 for shifting pixels comprises a step 810 of accessing a digital file. Act 810 includes accessing, from memory, a digital image file, wherein the digital image file comprises information that corresponds to individual pixels within the digital image. For example, as depicted and described with respect to FIG. 1, a user can upload a digital image through a client application 120. The computer system 100 then receives the digital image.

FIG. 8 also illustrates that the method 800 includes an act 820 of identifying a portion of an image to mask 820. Act 820 comprises identifying a particular portion of the digital image to mask, wherein the mask prevents pixels covered by the mask from being shifted. For example, as depicted and described with respect to FIGS. 3A-3C, a user is able to mask a particular portion of the digital image. The masked portion of the image is held static, such that the pixels do not shift.

Additionally, FIG. 8 illustrates that the method 800 includes an act 830 of receiving a starting point. Act 830 comprises receiving a first starting point through a user interface, wherein the first starting point is received through a user selection of a first beginning portion of the digital image. For example, as depicted and explained with respect to FIG. 5A, a user selects a starting point 550. Similarly, FIG. 3C depicts various user-selected starting points surrounding the grass in the digital image.

FIG. 8 also illustrates that the method 800 includes an act 840 of receiving an ending point. Act 840 comprises receive a first ending point through the user interface, wherein the first ending point is received through a user selection of a first ending portion of the user interface. For example, as depicted and explained with respect to FIG. 5A, a user selects an ending point 530. Similarly, FIG. 3C depicts various user-selected starting ending surrounding the grass in the digital image.

In addition, FIG. 8 illustrates that the method 800 includes an act 850 of creating a link between the beginning and the ending points. Act 850 comprises create a first link between the first starting point and the first ending point, wherein the first link comprises a first direction extending from the first starting point to the first ending point and a first length between the first starting point and the first ending point. For example, as depicted and explained with respect to FIG. 5A, a link 540 is created between beginning points 550 and ending points 530. Similarly, FIG. 3C depicts various links connecting beginning points and ending points.

Further, FIG. 8 illustrates that the method 800 includes an act 860 of identifying a set of pixels. Act 860 comprises identifying a first set of pixels that lie between the first starting point and the first ending point. For example, as depicted and explained with respect to FIG. 5A, the software architecture 200 identifies a set of pixels 500, 510, 520 that extend in the direction of the link 540 away from the starting point 550. The computer architecture 200 may define the set of pixels 500, 510, 520 as being every pixel that extends in the direction away from the starting point and that is within a user or computer-defined threshold distance from the link 540.

Further still, FIG. 8 illustrates that the method 800 includes an act 870 of shifting the set of pixels 870. Act 870 comprises shifting the second set of pixels in the second direction, wherein shifting the second set of pixels comprises rendering and re-rendering in a loop the second set of pixels being shifted. For example, as depicted and explained with respect to FIGS. 5A-5D, a shifting loop is described where pixels 500, 510, 520 are shifted upward and then re-looped.

Accordingly, disclosed embodiments provide novel and innovative technical methods for automatically shifting pixels within a digital image. The shifted pixels may give a digital image the perception of movement. At least one disclosed embodiment requires only a single digital image to create a perception of movement within the digital image. Disclosed embodiments also provide novel and innovative technical solutions for receiving user input through a computer interface to simply and efficiently manipulate a digital image by shifting pixels.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments. In various embodiments, disclosed methods and systems may comprises software executed within the cloud. For example, a user may access the software through a web browser. In additional or alternative embodiments, the software is executed locally at a device. For example, the software may be executed on a mobile computing device such as a smart phone or tablet.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for automating the shifting of pixels within a digital image, comprising:
   one or more processors; and
   one or more non-transitory computer-readable media having stored thereon executable instructions that when executed by the one or more processors configure the computer system to perform at least the following:
   access, from memory, a digital image file, wherein the digital image file comprises information that corresponds to individual pixels within the digital image;
   generate and display a user interface that includes the digital image, the user interface including selectable controls including a selectable control for indicating a first starting point of the digital image, and a selectable control for indicating a first ending point of the digital image;
   in response to detecting a user input interaction with the selectable control for indicating the first starting point of the digital image, receive the first starting point;
   in response to detecting a user input interaction with the selectable control for indicating the first ending point of the digital image, receive the first ending point;
   in response to detecting a user input interaction with the selectable control for indicating the particular portion of the digital image to mask, identify the particular portion of the digital image to mask, and generate and apply the mask to the particular portion of the digital image;
   in response to detecting a user input interaction with the selectable control for saving the mask, generating and storing a mask file that includes information about the mask, such that the mask file is saved separately from the digital image file, and such that the mask file is capable of being applied to a separate digital image file that is different than the digital image file;
   generate a first link between the first starting point and the first ending point, wherein the first link comprises:
   a first pathway extending in a first direction between the first starting point and the first ending point; and
   a first length extending along the first pathway between the first starting point and the first ending point;
   identify a first set of pixels that lie along the first link between the first starting point and the first ending point; and shift the first set of pixels in the first direction along the first length of the first pathway, wherein shifting the first set of pixels comprises rendering in a loop the first set of pixels being shifted.

2. The computer system of claim 1, wherein the executable instructions include instructions that are executable to configure the computer system to: when a pixel selected from the first set of pixels reaches the first ending point, cause the selected pixel to loop back to the first starting point, such that when the selected pixel loops back to the starting point, the selected pixel fades to disappear at the first ending point and fades to appear at the first starting point.

3. The computer system of claim 1, wherein the executable instructions include instructions that are executable to configure the computer system to:
generate and display a preview screen on the user interface, the preview screen comprising a modified digital image section that includes the digital image with the first set of pixels shifted along the first length of the first pathway.

4. The computer system of claim 3, the preview screen further comprising an original digital image section that includes the digital image with the first set of pixels being static in their original location.

5. The computer system of claim 1, the user interface further comprising a selectable control for indicating a second starting point on the digital image, and a selectable control for indicating a second ending point on the digital image, such that the executable instructions include instructions that are executable to configure the computer system to:
in response to detecting a user input interaction with the selectable control for indicating the second starting point of the digital image, receive the second starting point;
in response to detecting a user input interaction with the selectable control for indicating the second ending point of the digital image, receive the second ending point;
generate a second link between the second starting point and the second ending point, wherein the second link comprises:
a second pathway extending in a second direction between the second starting point and the second ending point; and a second length extending along the second pathway between the second starting point and the second ending point;
identify a second set of pixels that lie along the second link between the second starting point and the second ending point; and
shift the second set of pixels in the second direction along the second length of the second pathway, wherein shifting the second set of pixels comprises rendering in a loop the second set of pixels being shifted.

6. The computer system of claim 5, wherein the executable instructions include instructions that are executable to configure the computer system to;
generate a starting mesh from the first starting point and the second starting point;
generate an ending mesh from the first ending point and the second ending point; and
display the starting mesh and the ending mesh overlaid on the digital image on the user interface.

7. The computer system of claim 5, wherein the first direction is different from the second direction, and wherein the first ending portion is outside the edges of the digital image.

8. The computer system of claim 5, wherein the magnitude of the shifting of the first set of pixels is proportionally related to the first length and the magnitude of the shifting of the second set of pixels is proportionally related to the second length.

9. A method for automating the shifting of pixels within a digital image, comprising:
generating and displaying a user interface that includes the digital image, the user interface including selectable controls including a selectable control for indicating a first starting point of the digital image, and a selectable control for indicating a first direction associated with the first starting point;
in response to detecting a user input interaction with the selectable control for indicating the first starting point of the digital image, receiving the first starting point;
in response to detecting a user input interaction with the selectable control for indicating the first direction associated with the first starting point, receiving the first direction;
in response to detecting a user input interaction with the selectable control for applying the mask over the portion of the digital image, generating the mask over the portion of the digital image, wherein pixels under the mask are prevented from shifting;
selecting a first set of pixels extending in the first direction away from the first starting point; and
shifting the first set of pixels in the first direction, wherein shifting the first set of pixels comprises rendering in a loop the first set of pixels being shifted.

10. The method as recited in claim 9, further comprising a user interface including further selectable controls for indicating an ending point;
in response to detecting a user interaction with the selectable control for indicating the ending point, receiving the ending point.

11. The method as recited in claim 10, further comprising:
when a pixel selected from the first set of pixels reaches the first ending point, causing the selected pixel to loop back to the first starting point, such that when the selected pixel loops back to the starting point, the selected pixel fades to disappear at the first ending point and fades to appear at the first starting point.

12. The method as recited in claim 9, wherein the portion of the digital image is a particular pixel within the digital image, such that the generating of the mask over the portion of the digital image comprises generating the mask over the particular pixel within the digital image.

13. The method as recited in claim 9, further comprising a selectable control for indicating a second starting point of the digital image, and a selectable control for indicating a second direction associated with the second starting point, the method further comprising:
in response to detecting a user input interaction with the selectable control for indicating the second starting point of the digital image, receiving the second starting point;
in response to detecting a user input interaction with the selectable control for indicating the second direction associated with the second starting point, receiving the second direction;
selecting a second set of pixels extending in the second direction away from the second starting point; and
shifting the second set of pixels in the second direction, wherein shifting the second set of pixels comprises rendering in a loop the second set of pixels being shifted.

14. The method as recited in claim 13, wherein the first direction is different from the second direction.

15. A method for automating the shifting of pixels within a digital image, comprising:
- accessing, from memory, a digital image file, wherein the digital image file comprises information that corresponds to individual pixels within the digital image;
- generating and displaying a user interface that includes the digital image, the user interface including selectable controls including a selectable control for indicating a first starting point of the digital image, and a selectable control for indicating a first ending point of the digital image;
- in response to detecting a user input interaction with the selectable control for indicating the first starting point of the digital image, receiving the first starting point;
- in response to detecting a user input interaction with the selectable control for indicating the first ending point of the digital image, receiving the first ending point;
- in response to detecting a user input interaction with the selectable control indicating the particular portion of the digital image to mask, identifying the particular portion of the digital image to mask, and generating and applying the mask to the particular portion of the digital image;
- generating a first link between the first starting point and the first ending point, wherein the first link comprises:
- a first pathway extending in a first direction between the first starting point and the first ending point; and
- a first length extending along the first pathway between the first starting point and the first ending point;
- identifying a first set of pixels that lie along the first link between the first starting point and the first ending point; and
- shifting the first set of pixels in the first direction along the first length of the first pathway, wherein shifting the first set of pixels comprises rendering in a loop the first set of pixels being shifted.

16. The method of claim 15, the user interface further comprising a selectable control for indicating a second starting point on the digital image, and a selectable control for indicating a second ending point on the digital image;
- in response to detecting a user input interaction with the selectable control for indicating the second starting point of the digital image, receiving a second starting point;
- in response to detecting a user input interaction with the selectable control for indicating the second ending point of the digital image, receiving a second ending point;
- generating a second link between the second starting point and the second ending point, wherein the second link comprises:
- a second pathway extending in a second direction between the second starting point to the second ending point; and
- a second length extending along the second pathway between the second starting point and the second ending point;
- identifying a second set of pixels that lie along the second link between the second starting point and the second ending point; and
- shifting the second set of pixels in the second direction along the second length of the second pathway, wherein shifting the second set of pixels comprises rendering in a loop the second set of pixels being shifted.

17. A computer program product comprising one or more non-transitory computer storage media having stored thereon computer-executable instructions that, when transmitted to a remote computer system for execution at a processor, cause the remote computer system to perform a method for automating a shifting of pixels within an image file, when executed by the one or more processors configure the computer system to perform at least the following:
- access, from memory, a digital image file, wherein the digital image file comprises information that corresponds to individual pixels within the digital image;
- generate and display a user interface that includes the digital image, the user interface including selectable controls including a selectable control for indicating a first starting point of the digital image, and a selectable control for indicating a first ending point of the digital image;
- in response to detecting a user input interaction with the selectable control for indicating the first starting point of the digital image, receive the first starting point;
- in response to detecting a user input interaction with the selectable control for indicating the first ending point of the digital image, receive the first ending point;
- in response to detecting a user input interaction with the selectable control for indicating the particular portion of the digital image to mask, identify the particular portion of the digital image to mask, and generate and apply the mask to the particular portion of the digital image;
- in response to detecting a user input interaction with the selectable control for saving the mask, generating and storing a mask file that includes information about the mask, such that the mask file is saved separately from the digital image file, and such that the mask file is capable of being applied to a separate digital image file that is different than the digital image file;
- generate a first link between the first starting point and the first ending point, wherein the first link comprises:
- a first pathway extending in a first direction between the first starting point and the first ending point; and
- a first length extending along the first pathway between the first starting point and the first ending point;
- identify a first set of pixels that lie along the first link between the first starting point and the first ending point; and
- shift the first set of pixels in the first direction along the first length of the first pathway, wherein shifting the first set of pixels comprises rendering in a loop the first set of pixels being shifted, wherein, when a pixel selected from the first set of pixels reaches the first ending point, cause the selected pixel to loop back to the first starting point, such that when the selected pixel loops back to the starting point, the selected pixel fades to disappear at the first ending point and fades to appear at the first starting point.

* * * * *